(12) United States Patent
Kido et al.

(10) Patent No.: US 12,244,175 B2
(45) Date of Patent: Mar. 4, 2025

(54) MOTOR

(71) Applicant: DAIKIN INDUSTRIES, LTD., Osaka (JP)

(72) Inventors: Naohiro Kido, Osaka (JP); Yoshinari Asano, Osaka (JP); Tsukasa Asari, Osaka (JP); Hiroshi Hibino, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 193 days.

(21) Appl. No.: 17/923,905

(22) PCT Filed: Apr. 26, 2021

(86) PCT No.: PCT/JP2021/016594
§ 371 (c)(1),
(2) Date: Nov. 7, 2022

(87) PCT Pub. No.: WO2021/230058
PCT Pub. Date: Nov. 18, 2021

(65) Prior Publication Data
US 2023/0179032 A1    Jun. 8, 2023

(30) Foreign Application Priority Data

May 11, 2020    (JP) .................................. 2020-083256

(51) Int. Cl.
  *H02K 1/14*   (2006.01)
  *H02K 3/52*   (2006.01)
  *H02K 21/22*  (2006.01)

(52) U.S. Cl.
  CPC ............. *H02K 1/145* (2013.01); *H02K 3/525* (2013.01); *H02K 21/227* (2013.01); *H02K 2203/12* (2013.01)

(58) Field of Classification Search
  CPC ........ H02K 3/525; H02K 1/145; H02K 21/227
  See application file for complete search history.

(56) References Cited

U.S. PATENT DOCUMENTS

2007/0035197 A1    2/2007  Usui
2013/0002068 A1*   1/2013  Miyasaka .............. H02K 3/525
                                                            310/71

(Continued)

FOREIGN PATENT DOCUMENTS

EP          2466723 A1 *   6/2012   ............. H02K 1/145
JP          2006-14410 A   1/2006

(Continued)

OTHER PUBLICATIONS

EP-2466723-A1 machine translation, Jul. 13, 2024.*

(Continued)

*Primary Examiner* — Leda T Pham
(74) *Attorney, Agent, or Firm* — GLOBAL IP COUNSELORS, LLP

(57) ABSTRACT

A motor includes a stator having stacking coil units with a nonmagnetic body arranged between, and a rotatable rotor. Each of the coil units includes a coil, and a stator core. The coil includes an annular winding. The stator core is arranged to surround at least part of the winding. The stator core includes projections formed on axial ends of the stator core, alternately arranged in a circumferential direction, and projecting radially toward the rotor from the axial ends. The coil includes the winding and two leads extending from the winding. At least one of a first and a second of the two leads extends between stator cores of two of the coil units. A magnet pole is arranged in one of inner and outer circumferential portions of the stator core, and the first and second leads are arranged in an other one of inner and outer circumferential portions.

14 Claims, 18 Drawing Sheets

(56) References Cited

U.S. PATENT DOCUMENTS

| | | | |
|---|---|---|---|
| 2018/0269729 A1* | 9/2018 | Takemoto | H02K 15/03 |
| 2022/0181926 A1* | 6/2022 | Kido | H02K 1/145 |

FOREIGN PATENT DOCUMENTS

| | | |
|---|---|---|
| JP | 2007-49844 A | 2/2007 |
| JP | 2013-13209 A | 1/2013 |
| JP | 2013-150373 A | 8/2013 |
| JP | 2013-158072 A | 8/2013 |
| JP | 2015-67089 A | 4/2015 |
| JP | 2017-46420 A | 3/2017 |

OTHER PUBLICATIONS

International Search Report of corresponding PCT Application No. PCT/JP2021/016594 dated May 25, 2021.
European Search Report of corresponding EP Application No. 21 80 4029.3 dated May 2, 2024.
International Preliminary Report of corresponding PCT Application No. PCT/JP2021/016594 dated Nov. 15, 2022.

* cited by examiner

MOTOR

CROSS-REFERENCE TO RELATED APPLICATIONS

This U.S. National stage application claims priority under 35 U.S.C. § 119 (a) to Japanese Patent Application No. 2020-083256, filed in Europe on May 11, 2020, the entire contents of which are hereby incorporated herein by reference.

BACKGROUND

Technical Field

The present disclosure relates to a motor.

BACKGROUND ART

Japanese Laid-Open Patent Publication No. 2013-158072 discloses a motor including a stator and a rotor. The stator includes coil units. The coil units are stacked in the rotation axis direction. The coils of the coil units include leads extending between magnetic poles arranged in the outer circumferential surface of the stator.

SUMMARY

When the leads of the coils are arranged in an air gap between the rotor and the stator, the rotor may contact the leads. Contact between the rotor and the leads causes wear of the leads. It is an objective of the present disclosure to provide a motor that limits contact between the rotor and the leads.

A motor includes a stator including coil units stacked in an axial direction with a nonmagnetic body arranged in between and a rotor configured to be rotatable about a rotation axis. The coil units each include a coil and a stator core, the coil including an annular winding wound about the rotation axis, the stator core being arranged to surround at least part of the winding of the coil. The stator core includes projections formed on each of two axial ends of the stator core, alternately arranged in a circumferential direction, and projecting radially toward the rotor from the two axial ends of the stator core. The coil includes the winding and two leads extending from the winding. At least one of a first lead that is one of the two leads and a second lead that is the other one of the two leads is arranged to extend between stator cores of two of the coil units. A magnet pole is arranged in one of an inner circumferential portion and an outer circumferential portion of the stator core, and the first lead and the second lead are arranged in the other one of the inner circumferential portion and the outer circumferential portion.

With this structure, the first lead and the second lead are not arranged in the air gap between the rotor and the stator so that contact of the first lead and the second lead with the rotor is limited.

In the above motor, a spacer including the nonmagnetic body is arranged between the coil units. The spacer includes a lead guide that guides the lead. At least one of the first lead and the second lead is arranged to extend in the lead guide of the spacer. This structure limits displacement of the lead between the coil units.

In the above motor, the spacer includes at least one of a first engagement portion that engages the first lead and a second engagement portion that engages the second lead. This structure restricts movement of at least one of the first lead and the second lead when the motor vibrates.

In the above motor, the spacer includes at least one of a first bending guide that gradually bends the first lead and a second bending guide that gradually bends the second lead. This structure gradually bends at least one of the first lead and the second lead and reduces breaking of the at least one of the first lead and the second lead.

In the above motor, the stator core includes an annular first ring formed at one side in the axial direction, first projections that project radially from the first ring, and first claw poles arranged on the first projections and extending in the axial direction. The stator core further includes an annular second ring formed at another side in the axial direction, second projections that project radially from the second ring, and second claw poles arranged on the second projections and extending in the axial direction. The first claw poles and the second claw poles are alternately arranged in the circumferential direction. At least one of the first lead and the second lead extends out of the stator core from a first range surrounded by two adjacent ones of the first projections and the first ring or a second range surrounded by two adjacent ones of the second projections and the second ring and extends through a space between the stator cores of two of the coil units. This structure allows the at least one of the first lead 23 and the second lead 24 to be easily laid out.

In the above motor, at least one of the first lead and the second lead extends out of a space between the coil and the second claw pole in the first range or a space between the coil and the first claw pole in the second range and extends through a space between the stator cores of the two of the coil units. With this structure, at least one of the first lead and the second lead is sandwiched between the first claw pole and the coil or between the second claw pole and the coil. This avoids movement of the at least one of the first lead and the second lead into the air gap between the rotor and the stator.

In the above motor, the stator core includes a first core including the first ring, the first projections, and the first claw poles, and a second core including the second ring, the second projections, and the second claw poles. At least one of the first lead and the second lead extends through an inter-core gap between the first core and the second core at a coupling portion of the first core and the second core.

If a hole were to be formed in the first core or the second core, the insertion of the second lead through the hole would take time. In this respect, the above structure sets the arrangement of at least one of the first lead and the second lead when the first core and the second core are coupled during the manufacturing of the motor. This improves the production efficiency of the motor.

In the above motor, the coil units are coupled by a holding member that includes a rod extending through the coil units. The rod has an outer circumference that includes a rod guide. The first lead and the second lead are arranged along the rod guide. This structure restricts movement of the first lead and the second lead when the motor vibrates.

In the above motor, at least one of the first lead and the second lead includes a portion contacting the stator core, the portion is surrounded by an insulating member 98. This structure obtains a creepage distance between the lead and the stator core and improves insulation.

The above motor further includes a bobbin. The bobbin includes a tubular portion with a center at a rotation axis. The winding of the coil is formed by a wire wound around the tubular portion of the bobbin. The stator core holds the bobbin. With this structure, the coil is positioned relative to the stator core through a simple assembling process.

DETAILED DESCRIPTION OF EMBODIMENT(S)

A motor according to the present embodiment will now be described. It should be noted that the present disclosure is not limited to the examples described hereafter, but is intended to include any equivalence to the claims and any modification that is within the scope of the claims.

A motor 1 may be of an outer rotor type or an inner rotor type. In the present embodiment, the motor 1 is of the outer rotor type.

The motor 1 is installed in various types of electric devices and vehicles such as a two-wheel vehicle. For example, the motor 1 is used as a driving device for a fan of an air blower.

Figure 1:
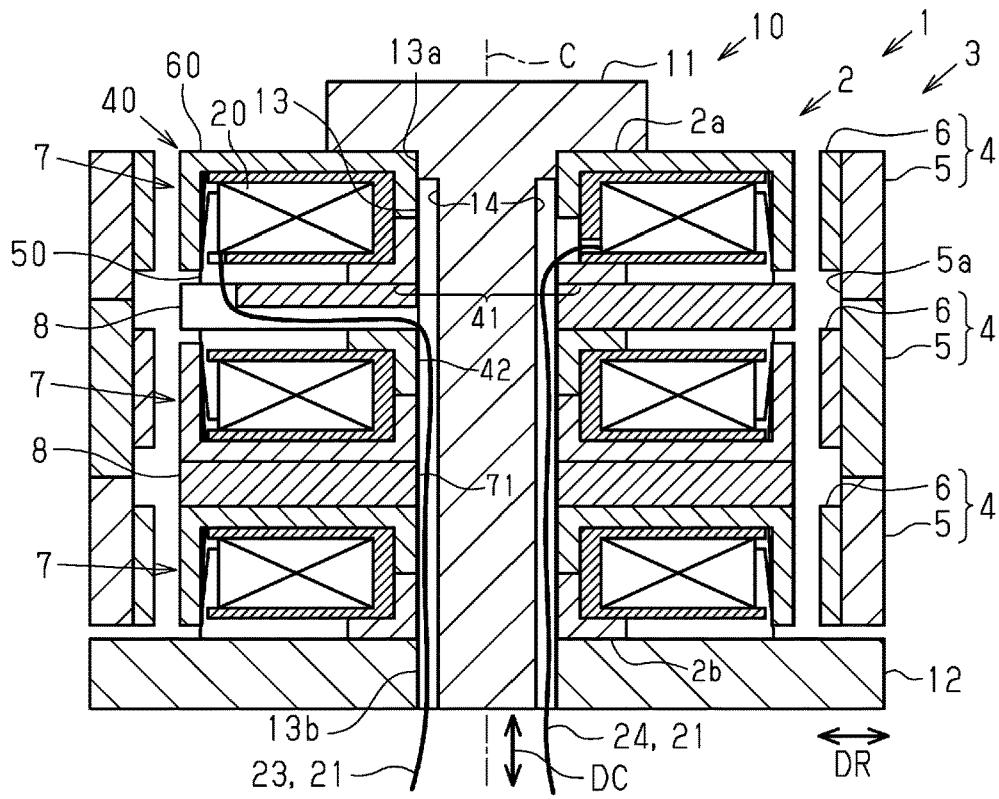
FIG. 1 is a cross-sectional view of a motor.

As shown in FIG. 1, the motor 1 is a multiphase motor. The motor 1 of the present embodiment is a three-phase motor. The motor 1 includes coil units 7 of a U-phase, a V-phase, and a W-phase. The coil units 7 of the U-phase, the V-phase, and the W-phase are stacked in a direction extending along a rotation axis C (hereinafter referred to as "rotation axis direction DC"). The motor 1 of the present embodiment is of the outer rotor type and includes a claw pole stator.

The motor 1 includes a stator 2 and a rotor 3. The rotor 3 is configured to be rotatable about the rotation axis. The rotor 3 rotates about the rotation axis C. The rotor 3 is configured so that the stator 2 is arranged inside the rotor 3. The rotor 3 includes rotor units 4, one for each phase. The rotor units 4 are stacked in the rotation axis direction DC. The rotor units 4 each include a tubular rotor core 5 that includes an inner circumferential surface 5a extending about the rotation axis C, and magnets 6 arranged on the inner circumferential surface 5a of the rotor core 5 at predetermined intervals in the circumferential direction. The magnets 6 are formed by permanent magnets.

Figure 2:
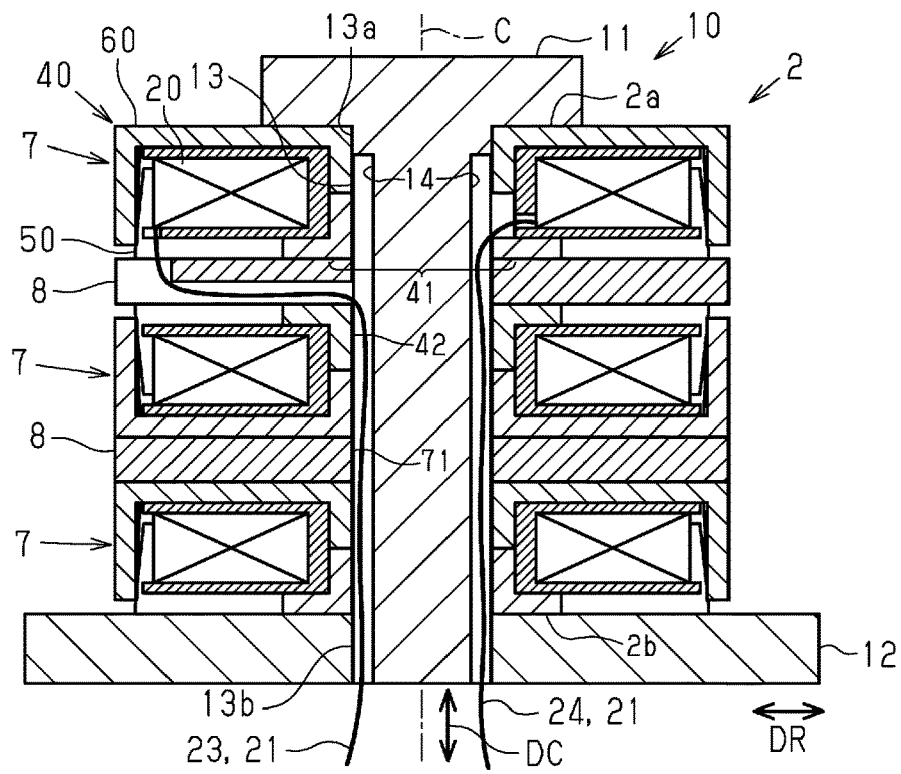
FIG. 2 is a cross-sectional view of a stator.

As shown in FIG. 2, the stator 2 includes the coil units 7. The stator 2 includes the coil units 7, one for each phase. The coil units 7 are stacked in the axial direction (the direction extending along the rotation axis direction DC) with nonmagnetic bodies arranged therebetween in the rotation axis direction DC. In the present embodiment, the nonmagnetic bodies are formed by spacers 8. The coil units 7 are held by a holding member 10.

The coil units 7 are coupled by the holding member 10. In the present embodiment, the coil units 7 and the spacers 8 are stacked alternately in the rotation axis direction DC and coupled by the holding member 10.

Specifically, a rod 13 is inserted into core insertion holes 42 of the coil units 7 and spacer insertion holes 71 of the spacers 8. In this state, a first member 11 is attached to one end of the rod 13, and a second member 12 is attached to the other end of the rod 13. Then, at least one of the first member 11 and the second member 12 is tightened. This sandwiches the coil units 7 and the spacers 8.

Examples of the nonmagnetic bodies include plastic, aluminum, air, and the like. In the present embodiment, the spacers 8 including nonmagnetic bodies are arranged between the coil units 7 so that nonmagnetic bodies are present between the coil units 7. The spacers 8 are arranged between the coil units 7 to restrict magnetic effects between the phases.

A first insulating member may be arranged between the stator 2 and the first member 11 of the holding member 10. A second insulating member may be arranged between the stator 2 and the second member 12 of the holding member 10. The holding member 10, when formed from a nonmagnetic material, does not need to include the first insulating member or the second insulating member. The holding member 10, when formed from a magnetic material, preferably includes the first insulating member and the second insulating member.

The coil units 7 will now be described with reference to FIGS. 3 to 9.

The coil units 7 each include a stator core 40 and a coil 20 including an annular winding 22 wound about the rotation axis C. Preferably, the coil unit 7 includes a bobbin 30.

Figure 3:
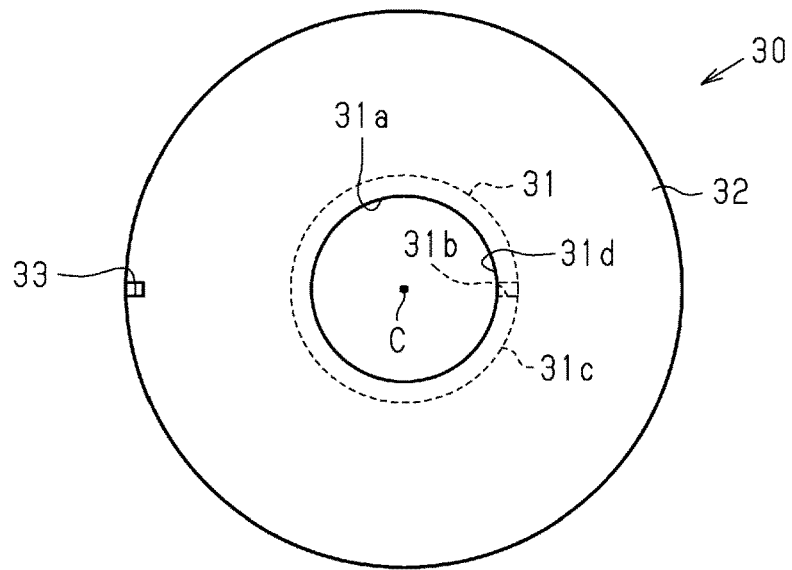
FIG. 3 is a plan view of a bobbin.

As shown in FIG. 3, the bobbin 30 includes two flanges 32 and a tubular portion 31 with a center at the rotation axis C. The tubular portion 31 includes an insertion hole 31a that extends along the rotation axis C. The insertion hole 31a is formed to receive a first tubular portion 52 and a second tubular portion 62 of the stator core 40, which will be described later. The two flanges 32 are arranged at the ends of the tubular portion 31 in the rotation axis direction DC.

In the present embodiment, one of the two flanges 32 of the bobbin 30 includes a catch 33 that catches a wire 21 of the coil 20. In one example, the catch 33 is formed by a notch in the outer edge of the flange 32. A through-hole 31b extends through the flange 32 of the tubular portion 31 near the tubular portion 31 of the bobbin 30. In the present embodiment, the through-hole 31b extends through the tubular portion 31 from an outer circumferential surface 31c to an inner circumferential surface 31d. The through-hole 31b is configured to allow for insertion of the wire 21 of the coil 20 through the through-hole 31b.

The coil 20 is formed by the wire 21. The wire 21 includes a conductive core and a coating layer that covers the core. The core is made of metal. In one example, the core is a copper wire. The coating layer is formed by an insulator. In one example, the coating layer is formed by an insulative resin.

Figure 4:
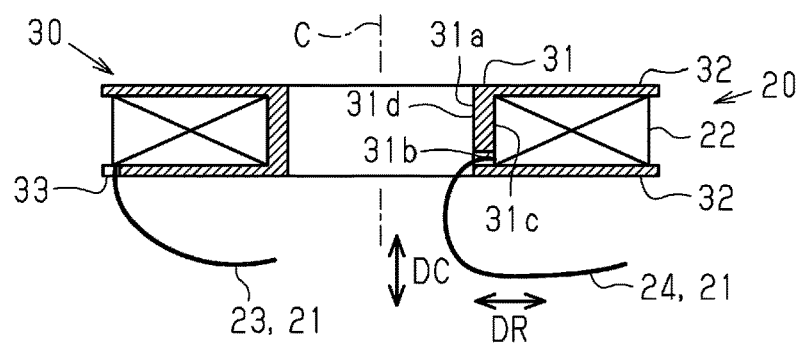
FIG. 4 is a cross-sectional view of the bobbin wound with a wire.

As shown in FIG. 4, the coil 20 includes the winding 22 and two leads (hereafter referred to as first lead 23 and second lead 24) extending from the winding 22. The winding 22 is formed by the wire 21 wound around the tubular portion 31 of the bobbin 30. The wire 21 may be wound in any manner. For example, the wire 21 may be wound around the bobbin 30 so that the first lead 23 and the second lead 24 are both arranged at the outer side of the bobbin 30 in a radial direction DR. In the present embodiment, the first lead 23 is arranged at the outer side of the bobbin 30 in the radial direction DR, and the second lead 24 is arranged at the inner side of the bobbin 30 in the radial direction DR. For example, when the second lead 24 is arranged at the inner side of the bobbin 30 in the radial direction DR, the wire 21 is wound around the tubular portion 31 of the bobbin 30 so that the first lead 23 is arranged at the outer side of the bobbin 30. The lead layout where the first lead 23 is arranged at the outer side of the bobbin 30 in the radial direction DR and the second lead 24 is arranged at the inner side of the bobbin 30 in the radial direction DR allows the coil 20 to be is easily formed through a simple method.

The first lead 23 is a portion including one end of the wire 21, and the second lead 24 is a portion including the other end of the wire 21. The first lead 23 and the second lead 24 extend from the coil 20 to the outer side of the stator 2.

The stator core 40 is formed by a ferromagnet. Examples of a ferromagnet include iron, nickel, cobalt, and a compound including at least one of these substances. The stator core 40 is configured to hold the bobbins 30. The stator core 40 includes a central portion 41, first claw poles 55 arranged on the outer circumference of the bobbin 30 at equal intervals, and second claw poles 65 arranged on the outer circumference of the bobbin 30 at equal intervals. The central portion 41 is configured to extend through the insertion hole 31a of the tubular portion 31 of the bobbin 30. The central portion 41 includes the core insertion hole 42 extending along the rotation axis C. The first claw poles 55 are continuous with one end of central portion 41 in the rotation axis direction DC, and the second claw poles 65 are continuous with the other end of the central portion 41 in the rotation axis direction DC. When current flows through the coil 20, the polarity of the second claw poles 65 will be opposite to that of the first claw poles 55. The central portion 41 is formed by first cores 50, each including a first tubular portion 52, and second cores 60, each including a second tubular portion 62, as will be described below. The stator core 40 is formed by plural members. An example of the stator core 40 will now be described.

As shown in FIG. 2, the stator core 40 surrounds at least part of the circumference of the winding 22 of the corresponding coil 20. The stator core 40 includes projections 54, 64. The projections 54, 64 are formed on the two ends of the stator core 40 in the axial direction (direction extending along rotation axis direction DC) and arranged alternately in the circumferential direction. The projections 54, 64 project toward the rotor 3 in the radial direction DR from the two ends of the stator core 40 in the axial direction (direction extending along rotation axis direction DC). The stator core 40 includes the first core 50 at one side in the axial direction and the second core 60 at the other side in the axial direction. In the present embodiment, the stator core 40 includes the first core 50 and the second core 60 coupled to the first core 50. For example, the first core 50 and the second core 60 are formed by powder magnetic cores. Alternatively, the first core 50 and the second core 60 may be formed by laminated magnetic cores.

Figure 5:
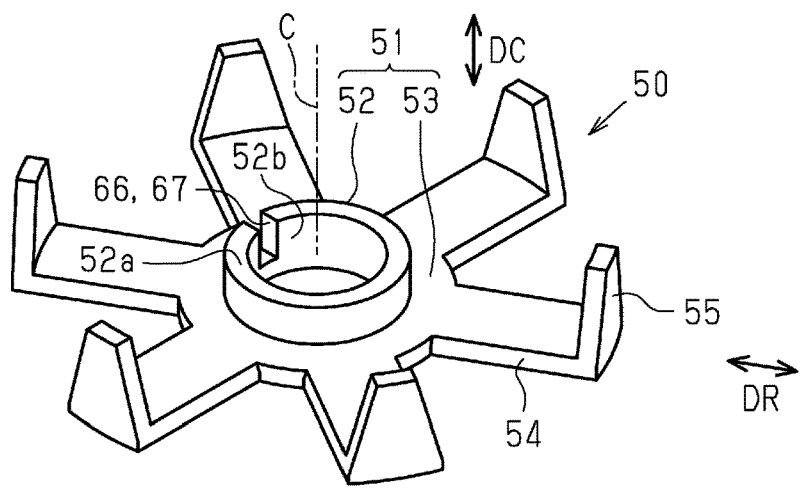
FIG. 5 is a perspective view of a first core.

As shown in FIG. 5, the first core 50 includes an annular first ring 51, first projections 54, and the first claw poles 55 extending in the axial direction. The first ring 51 includes the first tubular portion 52 with a center at the rotation axis C and a first flange 53 arranged on the outer circumference of the first tubular portion 52. The first tubular portion 52 is configured to be fitted into the insertion hole 31a of the tubular portion 31 of the bobbin 30. The first tubular portion 52 includes a first coupling surface 52a located toward the second core 60 in the rotation axis direction DC.

The first flange 53 includes the first projections 54 arranged at equal intervals in the circumferential direction. In the present embodiment, six first projections 54 are arranged on the first flange 53. The first projections 54 project from the first flange 53 in the radial direction DR. The surface facing the bobbin 30 on the first flange 53 and the first projections 54 is flat.

The first claw poles 55 extend from the distal ends of the first projections 54 in the rotation axis direction DC (axial direction). The first claw poles 55 are arranged at equal intervals along a circumference extending about the rotation axis C of the motor 1. The first claw poles 55 face the inner circumferential surface of the rotor 3 when the rotor 3 is coupled to the stator 2 (refer to FIG. 1).

Figure 6:
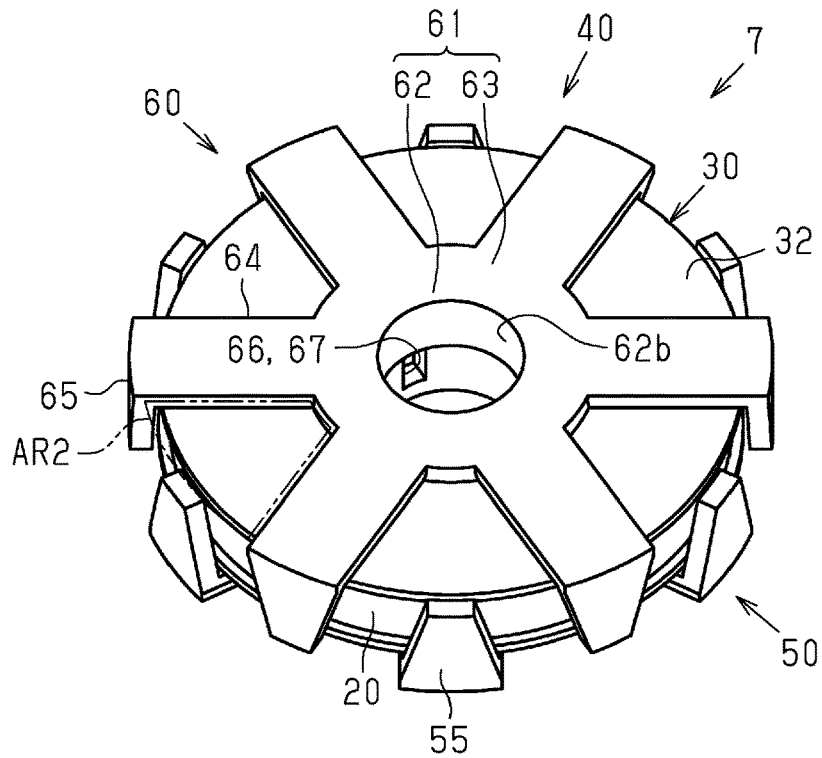
FIG. 6 is a perspective view of a coil unit.

As shown in FIG. 6, the second core 60 includes an annular second ring 61, second projections 64, and the second claw poles 65 extending in the axial direction. The second ring 61 includes the second tubular portion 62 of which center is the rotation axis C and a second flange 63 arranged on the outer circumference of the second tubular portion 62. The second tubular portion 62 is configured to be fitted into the insertion hole 31a of the tubular portion 31 of the bobbin 30. The second tubular portion 62 includes a second coupling surface 62a located toward the first core 50 in the rotation axis direction DC. The second coupling surface 62a contacts the first coupling surface 52a (refer to FIG. 9).

The second flange 63 includes the second projections 64 arranged at equal intervals in the circumferential direction. In the present embodiment, six first second projections 64 are arranged on the second flange 63. The second projections 64 project from the second flange 63 in the radial direction DR. The surface facing the bobbin 30 on the second flange 63 and the second projections 64 is flat.

The second claw poles 65 extend from the distal ends of the second projections 64 in the rotation axis direction DC (axial direction). The second claw poles 65 are arranged between the first claw poles 55 (refer to FIG. 7). Specifically, each second claw pole 65 is arranged at a position between two first claw poles 55 in the circumferential direction that extends about the rotation axis C. The second claw poles 65 face the inner circumferential surface of the rotor 3 when the rotor 3 is coupled to the stator 2 (refer to FIG. 1). The first claw poles 55 and the second claw poles 65 are arranged alternately in the circumferential direction.

Figure 9:
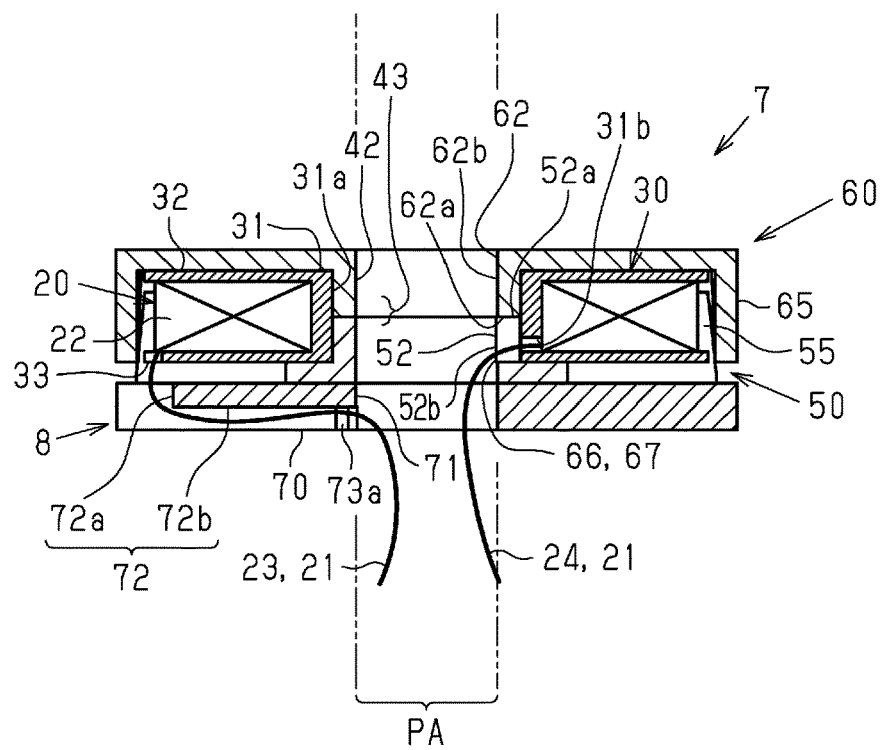
FIG. 9 is a cross-sectional view of the coil unit and the spacer.

As shown in FIG. 9, the second core 60 is coupled to the first core 50 so that the second coupling surface 62a contacts the first coupling surface 52a of the first core 50. The second tubular portion 62 of the second core 60 is connected to the first tubular portion 52 of the first core 50 through crimping, fusing, welding, or bonding. In the present embodiment, the first tubular portion 52 of the first core 50 and the second tubular portion 62 of the second core 60 are coupled at a coupling portion 43. The core insertion hole 42 of the central portion 41 is formed when a first insertion hole 52b of the first tubular portion 52 is connected to a second insertion hole 62b of the second tubular portion 62.

In the present embodiment, the coupling portion 43 of the first core 50 and the second core 60 includes an inter-core gap 66 between the first core 50 and the second core 60. The inter-core gap 66 is formed so that at least one of the first lead 23 and the second lead 24 is inserted through the inter-core gap 66. In the present embodiment, the first tubular portion 52 of the first core 50 includes a notch 67, through which the second lead 24 is inserted, as the inter-core gap 66.

As shown in FIG. 9, the bobbin 30 is accommodated in the annular space formed by the first core 50 and the second core 60. As described above, the first tubular portion 52 of the first core 50 and the second tubular portion 62 of the second core 60 are inserted into the insertion hole 31a of the bobbin 30. The bobbin 30 is sandwiched by the first flange 53 of the first core 50 and the second flange 63 of the second core 60. The catch 33 of the flange 32 of the bobbin 30 is arranged in a first range AR1 or a second range AR2 (refer to FIG. 7).

Figure 7:
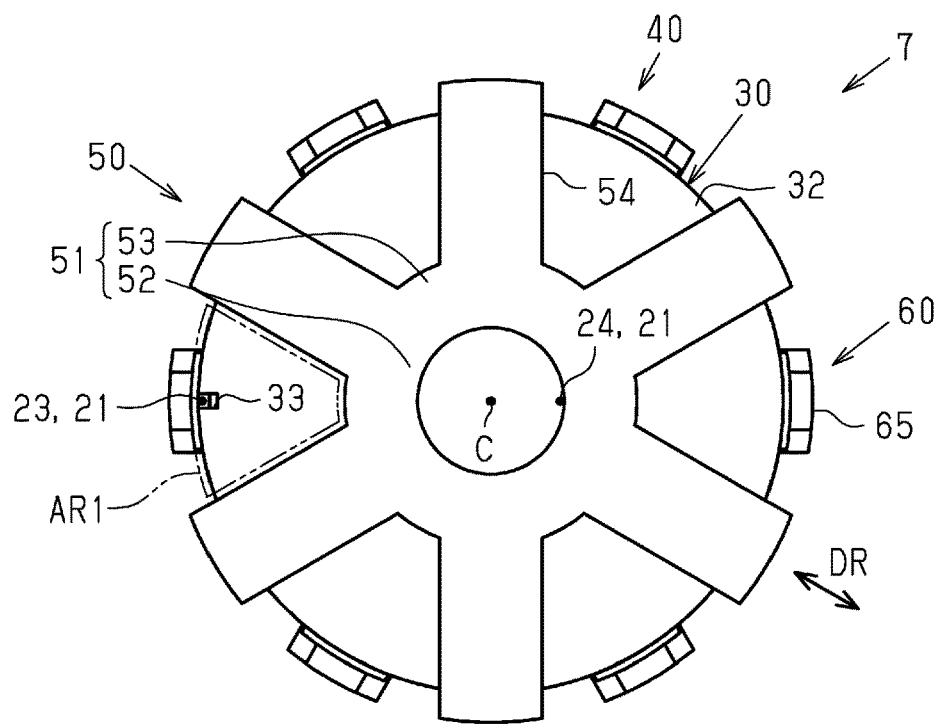
FIG. 7 is a plan view of the coil unit.

As shown in FIG. 7, the first range AR1 is arranged in the stator core 40 and extends from the first ring 51 between two adjacent ones of the first projections 54. Specifically, as viewed in the rotation axis direction DC, the first range AR1 is the area surrounded by the first ring 51, two adjacent ones of the first projections 54, and the second claw pole 65 arranged between the two adjacent ones of the first projections 54.

The second range AR2 is arranged and extends from the second ring 61 between two adjacent ones of the second projections 64. Specifically, as viewed in the rotation axis direction DC, the second range AR2 is the area surrounded by the second ring 61, two adjacent ones of the second projections 64, and the first claw pole 55 arranged between the two adjacent ones of the second projections 64.

Preferably, the catch 33 of the flange 32 of the bobbin 30 is arranged between the second claw pole 65 and the winding 22 of the coil 20 in the first range AR1. Alternatively, the catch 33 of the flange 32 of the bobbin 30 is arranged between the first claw pole 55 and the winding 22 of the coil 20 in the second range AR2.

At least one of the first lead 23 and the second lead 24 extends out of the first range AR1 or the second range AR2. The at least one of the first lead 23 and the second lead 24 further extends between the stator cores 40 of two coil units 7.

Preferably, at least one of the first lead 23 and the second lead 24 extends out of the space between the second claw pole 65 and the coil 20 in the first range AR1. Alternatively, at least one of the first lead 23 and the second lead 24 may extend out of the space between the first claw pole 55 and the coil 20 in the second range AR2. The at least one of the first lead 23 and the second lead 24 further extends between the stator cores 40 of two coil units 7.

In the present embodiment, the first lead 23 extends from the outer side of the bobbin 30 in the radial direction DR. The catch 33 of the flange 32 of the bobbin 30 is arranged between the second claw pole 65 and the winding 22 of the coil 20 in the first range AR1. The first lead 23 is hooked to the catch 33 in the flange 32 of the bobbin 30 and extended out of the space between the second claw pole 65 and the coil 20 in the first range AR1 of the first core 50.

As shown in FIG. 2, the spacers 8 are arranged between the coil units 7 as described above. The spacers 8 include nonmagnetic bodies. Preferably, the spacers 8 are formed by nonmagnetic bodies. For example, the spacers 8 are made of resin. The spacers 8 may include air. The spacers 8 are flat. The spacers 8 each include a spacer body 70. The spacer body 70 includes an insertion hole 71 through which the rod 13 of the holding member 10 is inserted.

Figure 8:
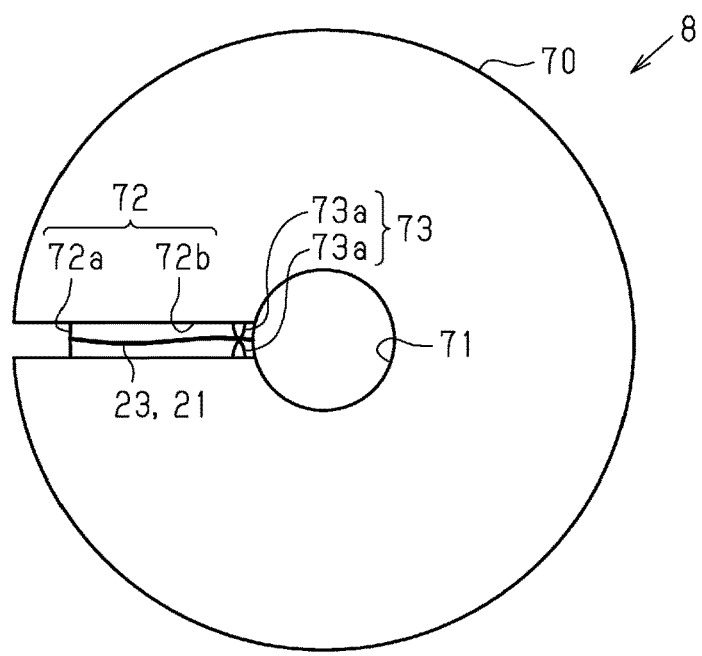
FIG. 8 is a plan view of a spacer.

As shown in FIG. 8, the spacer 8 includes a lead guide 72 that guides at least one of the first lead 23 and the second lead 24. The lead guide 72 includes an axial guide portion 72a and a radial guide portion 72b. The axial guide portion 72a is formed in the outer circumferential surface of the spacer body 70 to extend in the rotation axis direction DC. The radial guide portion 72b is formed to be continuous with the axial guide portion 72a and arranged in one of the surfaces of the spacer body 70 to extend from the outer edge to the inner edge of the spacer body 70.

Preferably, the spacer 8 includes at least one of a first engagement portion 73 (refer to FIG. 8), which engages the first lead 23, and a second engagement portion 78 (refer to FIG. 24), which engages the second lead 24. In the present embodiment, the spacer 8 includes the first engagement portion 73, which engages the first lead 23. The first engagement portion 73 is arranged in the lead guide 72. The first engagement portion 73 includes two protrusions 73a that hold the first lead 23 in between. The two protrusions 73a protrude from the side surfaces of the groove forming the lead guide 72.

The layout of the first lead 23 and the second lead 24 will now be described with reference to FIG. 9. The first claw poles 55 and the second claw poles 65 are arranged in one of the inner circumferential portion and the outer circumferential portion of the stator core 40, and the first lead 23 and the second lead 24 are arranged in the other one of the inner circumferential portion and the outer circumferential portion. In the present embodiment, the first claw poles 55 and the second claw poles 65 are arranged in the outer circumferential portion of the stator core 40. The first lead 23 and the second lead 24 are arranged in the inner circumferential portion of the stator core 40. The inner circumferential portion PA of the stator core 40 is a tubular inner space extending from the inner circumferential surface of the core insertion hole 42 in the stator core 40. The outer circumferential portion of the stator core 40 is a tubular outer space extending from the outer circumferential surface of the stator core 40.

At least one of the first lead 23 and the second lead 24 is arranged to extend between the stator cores 40 of two coil units 7. At least one of the first lead 23 and the second lead 24 is arranged to extend in the lead guide 72 of the spacer 8. At least one of the first lead 23 and the second lead 24 is arranged to extend through the inter-core gap 66 between the first core 50 and the second core 60. The first lead 23 and the second lead 24 are arranged along rod guides 14.

In the present embodiment, the first lead 23 is extended from the outer side of the bobbin 30 in the radial direction DR, arranged in the lead guide 72 of the spacer 8 to extend between the stator cores 40, arranged in the inner circumferential portion PA of the stator core 40, and arranged along the rod guide 14.

The second lead 24 is arranged at the inner side of the bobbin 30 in the radial direction DR, inserted through the through-hole 31b of the bobbin 30 and the inter-core gap 66 of the stator core 40, arranged in the inner circumferential portion PA of the stator core 40, and arranged along the rod guide 14.

Figure 10:
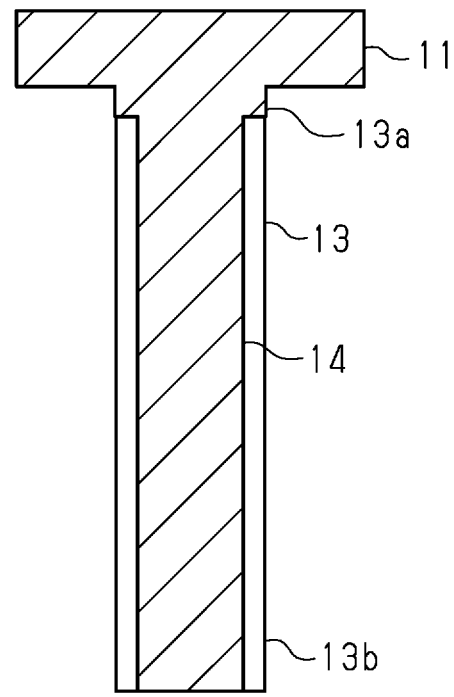
FIG. 10 is a cross-sectional view of a member formed by coupling a first member to a rod.
Figure 11:
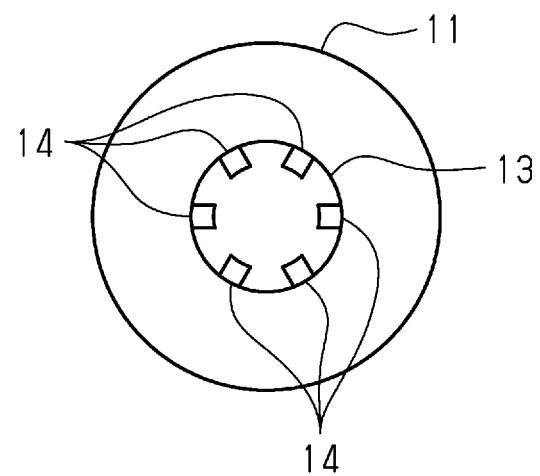
FIG. 11 is a plan view of the member, which is formed by coupling the first member to the rod.

As shown in FIGS. 10 and 11, the holding member 10 includes the first member 11, the second member 12, and the rod 13. The first member 11 directly or indirectly contacts a first end surface 2a, which is one end of the stator 2 in the rotation axis direction DC. The second member 12 is configured to directly or indirectly contact a second end surface 2b, which is the other end of the stator 2 that is opposite to the first end surface 2a in the rotation axis direction DC.

As shown in FIG. 1, the rod 13 connects the first member 11 to the second member 12. The first member 11 is coupled to a first end 13a of the rod 13. The second member 12 is coupled to a second end 13b of the rod 13 that is opposite to the first end 13a. At least one of the first member 11 and the second member 12 is connected to the rod 13. In the present embodiment, the second member 12 is coupled to the rod 13 with a screw structure. The first member 11 is formed integrally with the rod 13.

The rod 13 is configured to extend through the coil units 7. Specifically, the rod 13 is configured to be inserted through the core insertion holes 42 of the stator cores 40. The rod 13 has an outer circumference that includes the rod guides 14. The rod guides 14 each extend from the vicinity of the first end 13a to the second end 13b in the longitudinal direction of the rod 13. The rod guide 14 is recessed from the outer circumferential surface of the rod 13 to receive at least one of the first lead 23 and the second lead 24. In the present embodiment, the outer circumferential surface of the rod 13 includes six rod guides 14. The rod guides 14 each accommodate one of the first lead 23 and the second lead 24 of the phases.

Figure 12:
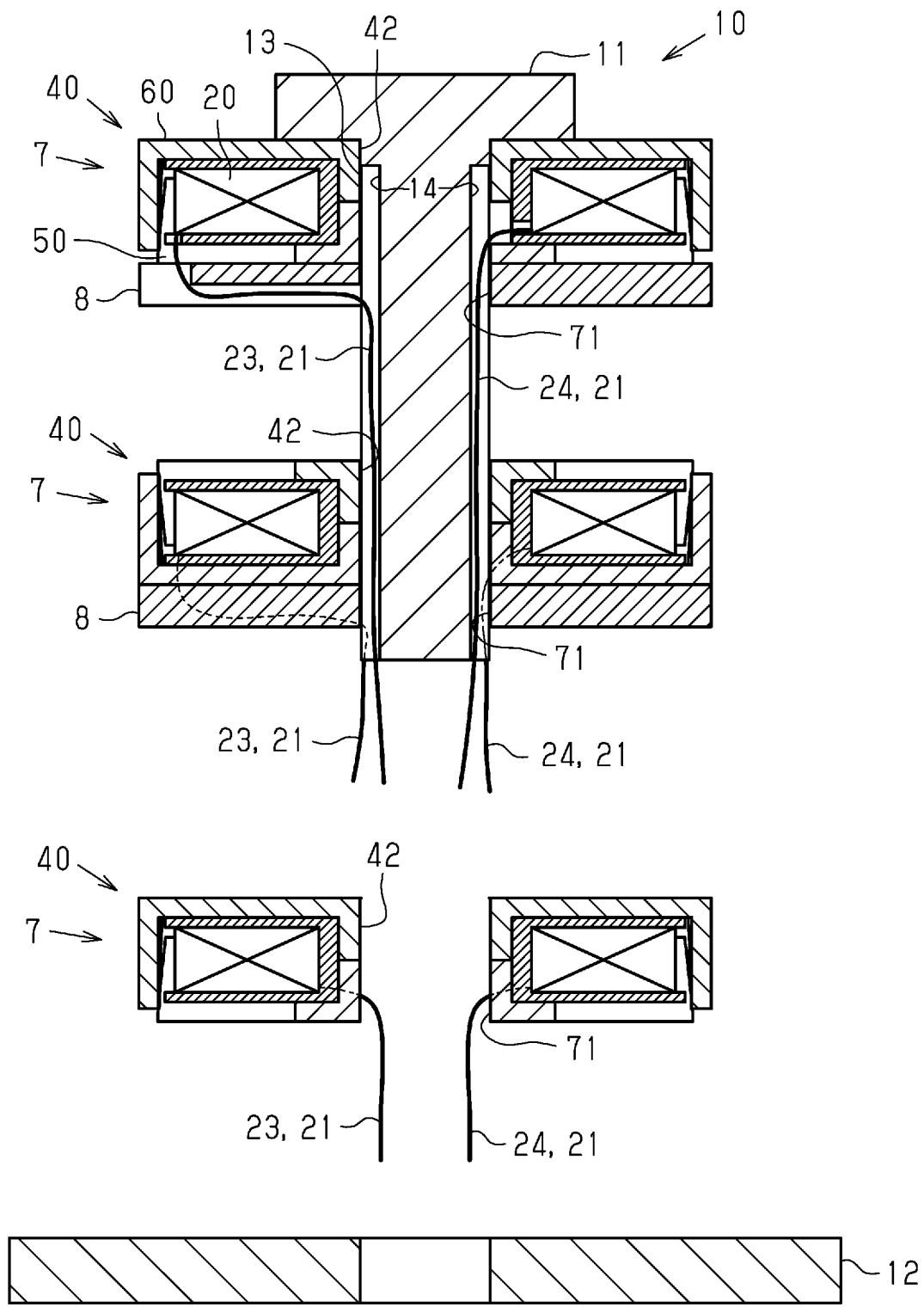
FIG. 12 is a schematic diagram showing how a motor is manufactured.

A method for manufacturing the motor 1 will now be described with reference to FIG. 12.

In this example, the first member 11 is formed integrally with the rod 13. The coil units 7 are assembled in advance. The first leads 23 and the second leads 24 extend from the coils 20 of the coil units 7. The coil units 7 are fitted onto the rod 13 so that the rod 13 extends through the core insertion holes 42 with the first leads 23 and the second leads 24 arranged in separate rod guides 14. The motor 1 is assembled through the following procedures. The coil unit 7 of a first phase (for example, U-phase) is fitted onto the rod 13, then the spacer 8 is fitted onto the rod 13, and then the coil unit 7 of a second phase (for example, V-phase) is fitted onto the rod 13. Then, the spacer 8 is fitted onto the rod 13, and the coil unit 7 of a third phase (for example, W-phase) is fitted onto the rod 13. Then, the second member 12 is fastened to the second end 13b of the rod 13. The second member 12 is tightened so that the three coil units 7 and the two spacers 8 are held by the holding member 10.

The operation of the present embodiment will now be described.

The first claw poles 55 and the second claw poles 65 are arranged in one of the inner circumferential portion PA and the outer circumferential portion of the stator core 40. If at least one of the first lead 23 and the second lead 24 were to be arranged in the same portion of the stator core 40 where the first claw poles 55 and the second claw poles 65 are arranged, at least one of the first lead 23 and the second lead 24 would be arranged in an air gap between the stator 2 and the rotor 3. In this case, the at least one of the first lead 23 and the second lead 24 may contact the rotor 3. In the present embodiment, the first lead 23 and the second lead 24 are not laid out in or near the air gap between the rotor 3 and the stator 2. Alternatively, the first lead 23 and the second lead 24 are laid out so that the portions in or near the air gap between the rotor 3 and the stator 2 are reduced in length. This limits contact of the first lead 23 and the second lead 24 with the rotor 3.

The present embodiment has the following advantages.

(1) In the motor 1, at least one of the first lead 23 and the second lead 24 of the coil 20 is arranged to extend between the stator cores 40 of two coil units 7. Further, the first claw poles 55 and the second claw poles 65 are arranged in one of the inner circumferential portion PA and the outer circumferential portion of the stator core 40, and the first lead 23 and the second lead 24 are arranged in the other one of the inner circumferential portion and the outer circumferential portion.

With this structure, the first lead 23 and the second lead 24 are not arranged in the air gap between the rotor 3 and the stator 2 so that contact of the first lead 23 and the second lead 24 with the rotor 3 is limited.

(2) The spacers 8 including nonmagnetic bodies are arranged between the coil units 7. At least one of the first lead 23 and the second lead 24 is arranged to extend in the lead guide 72 of the spacer 8. This structure limits displacement of the lead between the coil units 7.

(3) The spacer 8 includes at least one of the first engagement portion 73, which engages the first lead 23, and the second engagement portion 78, which engages the second lead 24. This structure restricts movement of at least one of the first lead 23 and the second lead 24 when the motor 1 vibrates. In other words, the structure restricts wear of at least one of the first lead 23 and the second lead 24 when vibration of the motor 1 vibrates the leads.

(4) At least one of the first lead 23 and the second lead 24 is extended out of the first range AR1 or the second range AR2 and arranged to extend through the space between the stator cores 40 of the two coil units 7. This structure allows the at least one of the first lead 23 and the second lead 24 to be easily laid out.

(5) At least one of the first lead 23 and the second lead 24 is extended out of the space between the second claw pole 65 and the coil 20 in the first range AR1. Alternatively, at least one of the first lead 23 and the second lead 24 is extended out of the space between the first claw pole 55 and the coil 20 in the second range AR2. Further, the at least one of the first lead 23 and the second lead 24 is extended between the stator cores 40 of two coil units 7. With this structure, at least one of the first lead 23 and the second lead 24 is sandwiched between the first claw pole 55 and the coil 20 or between the second claw pole 65 and the coil 20. This avoids movement of the at least one of the first lead 23 and the second lead 24 into the air gap between the rotor 3 and the stator 2.

(6) At least one of the first lead 23 and the second lead 24 extends through the inter-core gap 66 between the first core 50 and the second core 60 at the coupling portion 43 of the first core 50 and the second core 60.

If a hole were to be formed in the first core 50 or the second core 60, the insertion of the second lead 24 through the hole would take time. In this respect, the above structure sets the arrangement of at least one of the first lead 23 and the second lead 24 when the first core 50 and the second core 60 are coupled during the manufacturing of the motor 1. This improves the production efficiency of the motor 1.

(7) The first lead 23 and the second lead 24 are arranged along the rod guides 14 of the holding member 10. This structure restricts movement of the first lead 23 and the second lead 24 when the motor 1 vibrates.

(8) The motor 1 further includes the bobbin 30. The winding 22 of the coil 20 is formed by winding the wire 21 around the tubular portion 31 of the bobbin 30. The stator core 40 holds the bobbin 30. With this structure, the coil 20 is positioned relative to the stator core 40 through a simple assembling process.

Modifications

Modifications of the motor 1 of the above embodiment will now be described below. In the description of modifications, the same reference numerals are given to configurations that are the same as those of the embodiment to facilitate the description, and such configurations are not described. The motor 1 in the modifications described below has substantially the same advantages as the motor 1 of the embodiment.

First Modification

Figure 13:
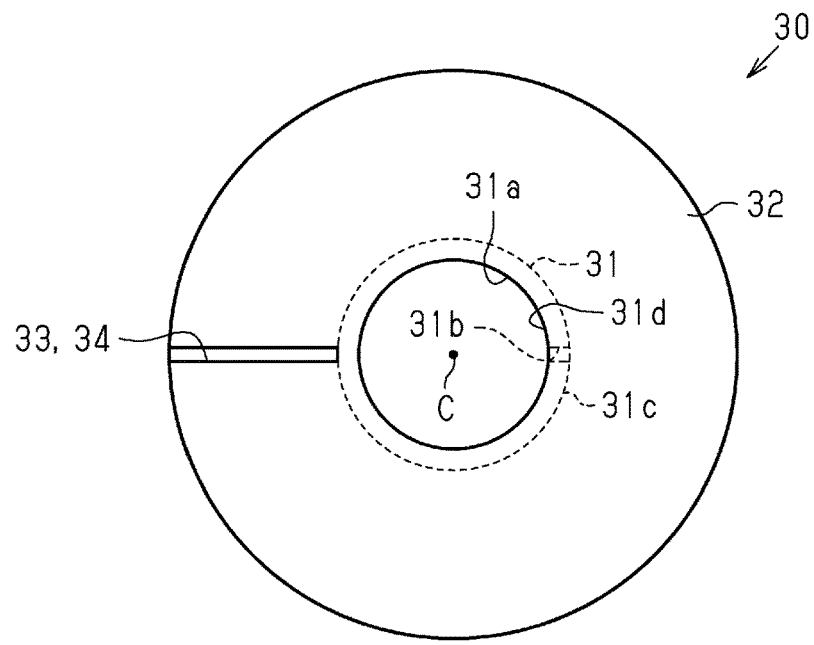
FIG. 13 is a plan view of the bobbin according to a first modification.
Figure 14:
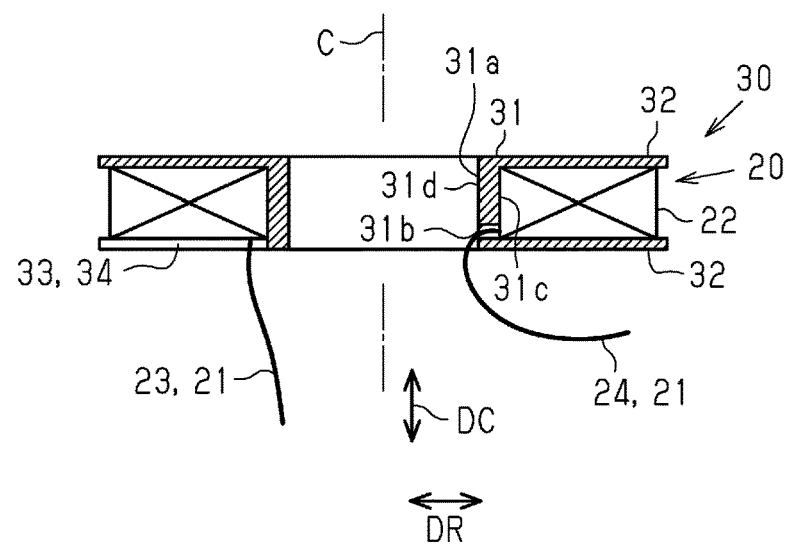
FIG. 14 is a cross-sectional view of the bobbin wound with a wire.

The bobbin 30 according to a modification will now be described with reference to FIGS. 13 and 14. In this example, the first lead 23 extends out of the bobbin 30 from a portion that differs from that of the first embodiment. In the first embodiment, the catch 33 of the bobbin 30 is formed by a notch near the outer edge of the flange 32. In this example, the catch 33 of the bobbin 30 is formed by a slit 34 that extends in the radial direction DR. The width of the slit 34 is set to allow the first lead 23 to pass through the slit 34. The first lead 23 extends out of the bobbin 30 from near the tubular portion 31. In this case, the spacer 8 includes a slit (refer to spacer slit 75 of FIG. 21). The first lead 23 extends through the slit 34 of the bobbin 30, the first range AR1 of the first core 50, and the slit of the spacer 8, and is guided to the rod guide 14 of the rod 13 of the holding member 10. In this example, the portion of the first lead 23 that extends through the slit of the spacer 8 is arranged between the stator cores 40. In the bobbin 30 of the first embodiment, the through-hole 31b through which the second lead 24 extends may be replaced by the slit 34.

Second Modification

Figure 15:
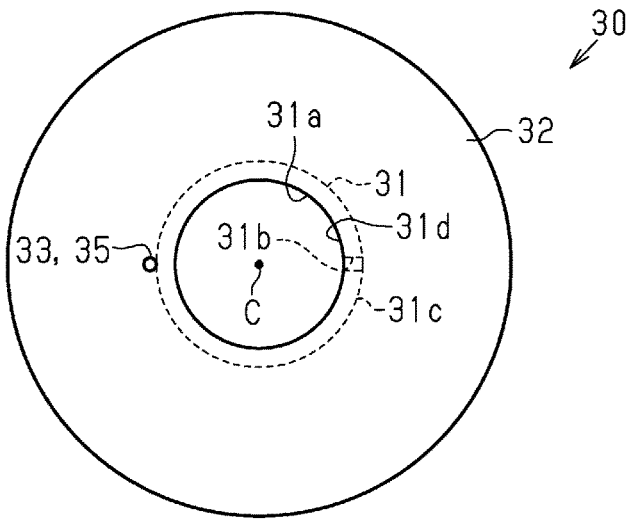
FIG. 15 is a plan view of the bobbin according to a second modification.

The bobbin 30 according to another modification will now be described with reference to FIG. 15. In the first embodiment, the catch 33 of the bobbin 30 is formed by a notch near the outer edge of the flange 32. In this example, the catch 33 of the bobbin 30 is formed by a through-hole 35 in the flange 32 near the tubular portion 31. In this case, the spacer 8 includes a slit (refer to spacer slit 75 of FIG. 21). The first lead 23 extends through the through-hole 35 of the bobbin 30, the first range AR1 of the first core 50, and the slit of the spacer 8, and is guided to the rod guide 14 of the rod 13 of the holding member 10. In the bobbin 30 of the first embodiment, the through-hole 31b through which the second lead 24 extends may be replaced by the through-hole 35 of the modification.

Third Modification

Figure 16:
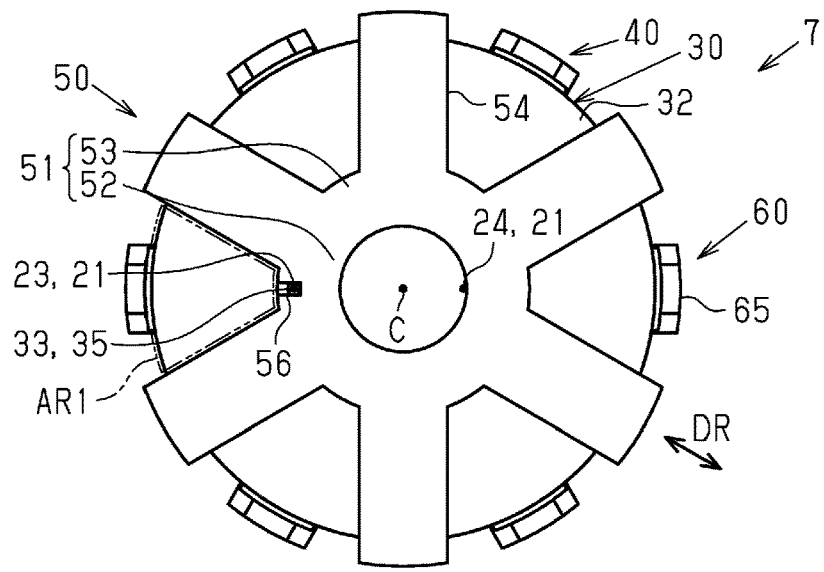
FIG. 16 is a plan view of the coil unit according to a third modification.
Figure 17:
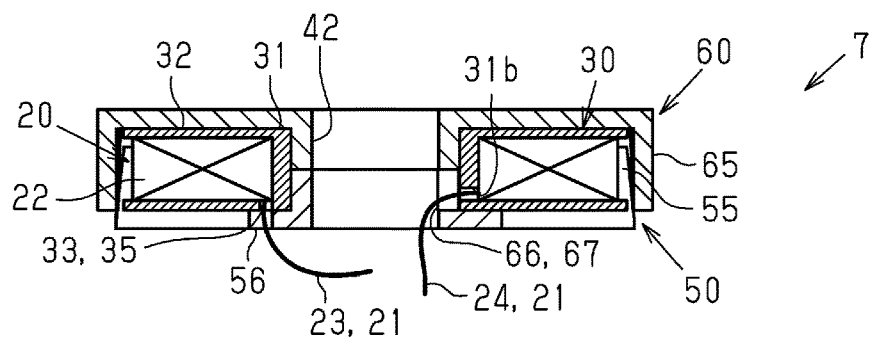
FIG. 17 is a cross-sectional view of the coil unit.

The first core 50 according to another modification will now be described with reference to FIGS. 16 and 17. The coil unit 7 shown in FIGS. 16 and 17 includes the bobbin 30 of the second modification. In the first core 50 of the third modification, the first flange 53 includes a core catch 56. The core catch 56 is formed by a recess, which engages the first lead 23. The core catch 56 is arranged in the first range AR1 of the first core 50. The first lead 23 hooked to the core catch 56. This restricts movement of the first lead 23 when the motor 1 vibrates.

Fourth Modification

Figure 18:
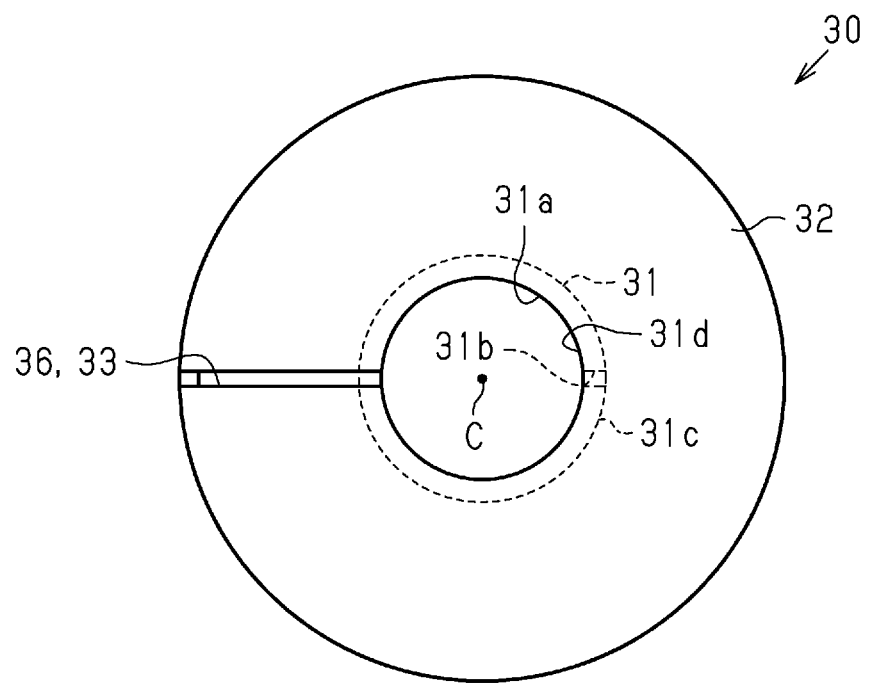
FIG. 18 is a plan view of the bobbin according to a fourth modification.
Figure 19:
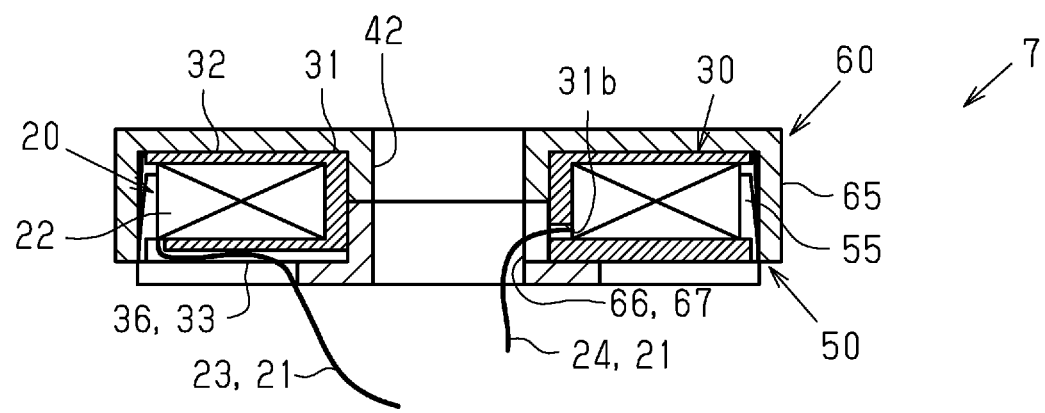
FIG. 19 is a cross-sectional view of the coil unit.

The bobbin 30 according to another modification will now be described with reference to FIGS. 18 and 19. The catch 33 of the bobbin 30 may be arranged in a groove 36. The groove 36 is arranged in the one of the two flanges 32 that is closer to the first core 50 and in the surface of that flange that is closer to the coil 20. Preferably, the thickness of the flange 32 that includes the groove 36 is greater than the thickness of the flange 32 that does not include the groove 36. The width of the groove 36 is set to allow the first lead 23 to pass through the groove 36.

Fifth Modification

Figure 20:
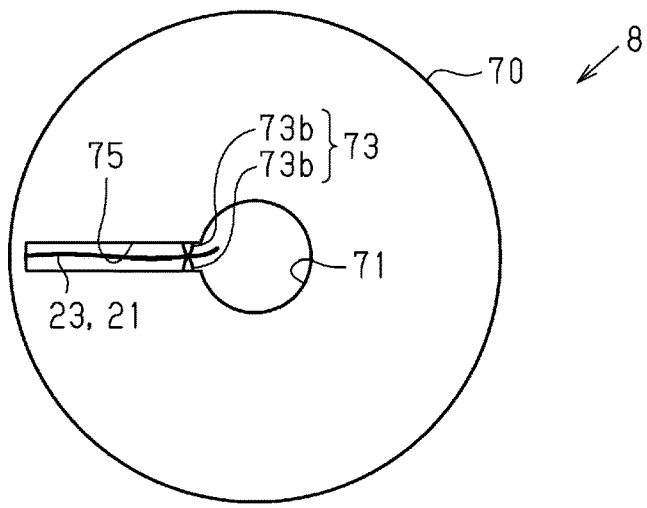
FIG. 20 is a plan view of the spacer according to a fifth modification.
Figure 21:
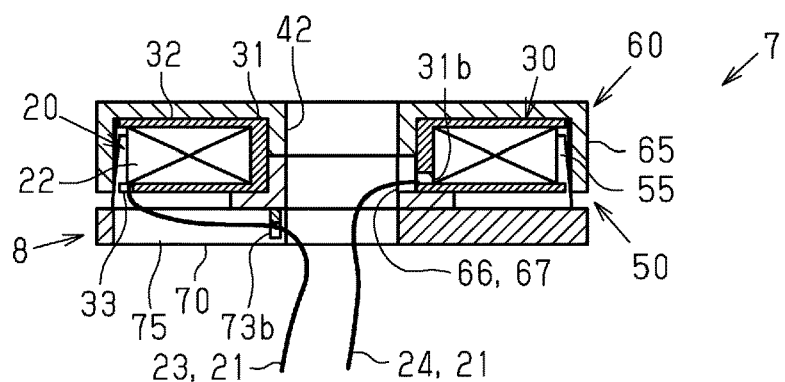
FIG. 21 is a cross-sectional view of the coil unit and the spacer.

The spacer 8 according to another modification will now be described with reference to FIGS. 20 and 21. The spacer 8 includes the spacer slit 75 extending in the radial direction DR. The width of the spacer slit 75 is set to allow the first lead 23 to pass through the spacer slit 75. Preferably, the spacer slit 75 includes the first engagement portion 73, which engages the first lead 23 in the same manner as in the embodiment. The first engagement portion 73 is formed by two protrusions 73b. In the rotation axis direction DC, the distal ends of the two protrusions 73b are joined in part and separated in part. The partial coupling of the two protrusions 73b maintains the shape of the spacer slit 75. The first lead 23 is held between the separated portions of the two protrusions 73b.

Sixth Modification

Figure 22:
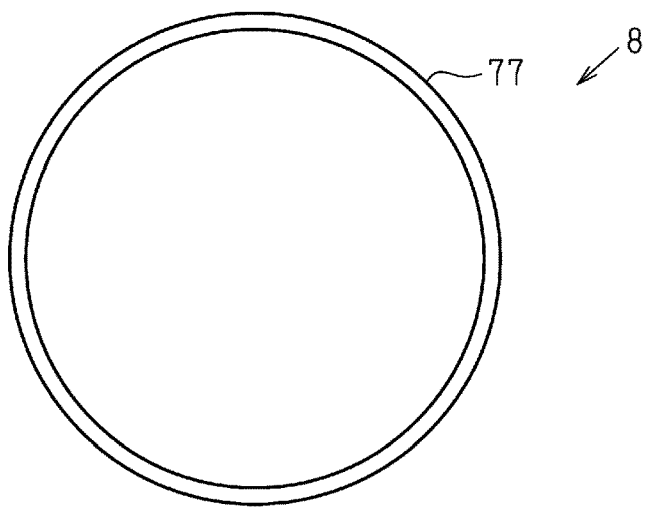
FIG. 22 is a plan view of the spacer according to a sixth modification.
Figure 23:
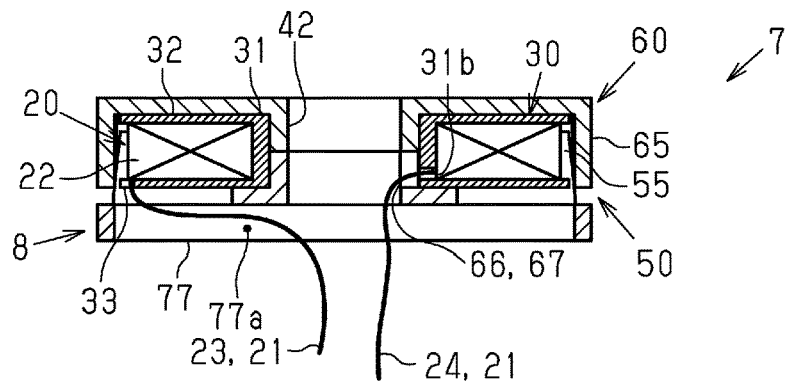
FIG. 23 is a cross-sectional view of the coil unit and the spacer.

The spacer 8 according to another modification will now be described with reference to FIGS. 22 and 23. In this example, the spacer 8 is not fitted onto the rod 13 of the holding member 10. The spacer 8 is supported and held between the coil units 7. A spacer body 77 is ring-shaped and has an inner diameter that is greater than the diameter of the rod 13. Preferably, the inner diameter of the spacer body 77 is substantially the same as the diameter of the bobbin 30. When the motor 1 is assembled, the spacer 8 forms an air layer 77a (nonmagnetic body layer) between the coil units 7. The first lead 23 extends through the spacer body 77. In this manner, the spacer 8 is not limited to the shape illustrated in the embodiment. The spacer 8 may be rectangular or triangular.

Seventh Modification

Figure 24:
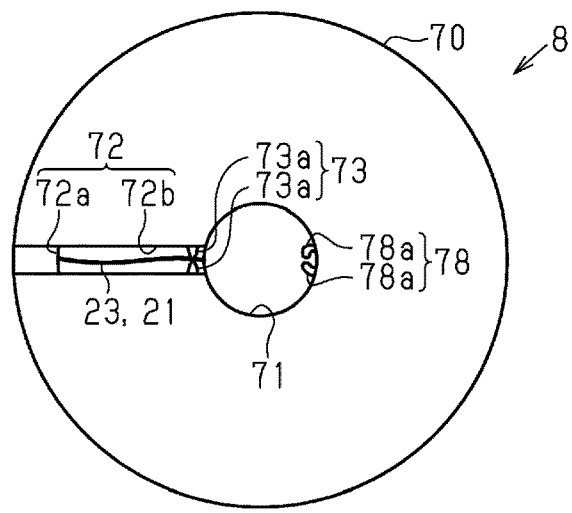
FIG. 24 is a plan view of the spacer according to a seventh modification.
Figure 25:
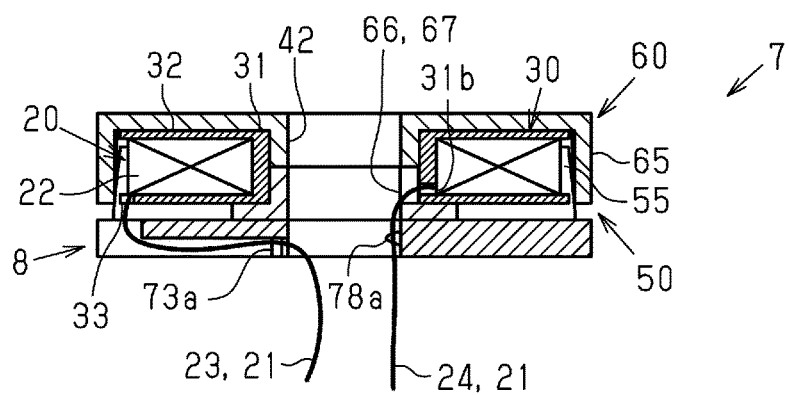
FIG. 25 is a cross-sectional view of the coil unit and the spacer.

The spacer 8 according to another modification will now be described with reference to FIGS. 24 and 25. In this example, the spacer 8 includes the second engagement portion 78 that engages the second lead 24. The second engagement portion 78 is arranged on the inner circumferential surface of the insertion hole 71 of the spacer 8. The second engagement portion 78 is formed to be two flaps 78a that hold the second lead 24. The second lead 24 is held by the second engagement portion 78. This structure restricts movement of the second lead 24 when the motor 1 vibrates.

Eighth Modification

Figure 26:
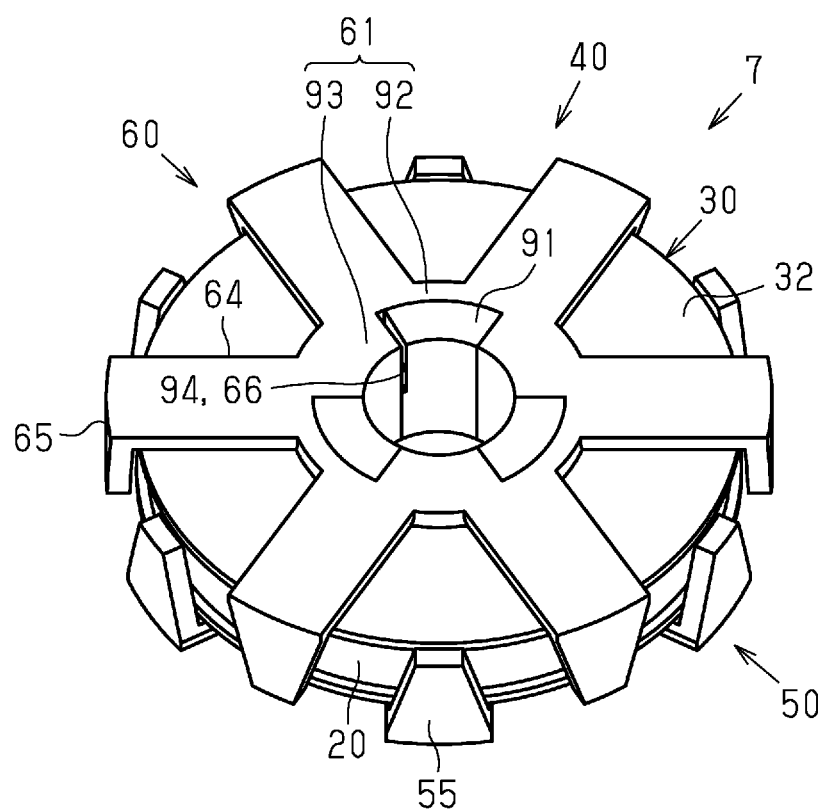
FIG. 26 is a perspective view of the coil unit according to an eighth modification.

The stator core 40 according to another modification will now be described with reference to FIG. 26. The first ring 51 of the first core 50 includes a connection ring (not shown) that connects the six first projections 54 and three first fitting portions 91 arranged in the inner circumferential portion of the connection ring. The first fitting portions 91 extend in the rotation axis direction DC. The second ring 61 of the second core 60, which has the same structure as the first ring 51 of the first core 50, includes a connection ring 92 and second fitting portions 93. The second fitting portions 93 of the second core 60 are fitted between the first fitting portions 91 of the first core 50 to couple the second core 60 to the first core 50. Such a fitting structure joins the first core 50 and the second core 60.

The inter-core gap 66 is formed between the first fitting portion 91 and the second fitting portion 93. In the present embodiment, the inter-core gap 66 is formed by a cutout 94 in the first fitting portion 91. Alternatively, the second fitting portion 93 may include the cutout 94. The cutout 94 is formed so that the second lead 24 extends through the cutout 94. This structure allows the second lead 24 to be arranged when the first core 50 and the second core 60 are coupled during the manufacturing of the motor 1 so that the production efficiency of the motor 1 is improved.

Ninth Modification

Preferably, a portion of at least one of the first lead 23 and the second lead 24 that contacts the stator core 40 is surrounded by an insulating member 98. Examples are described in a ninth modification and a tenth modification.

Figure 27:
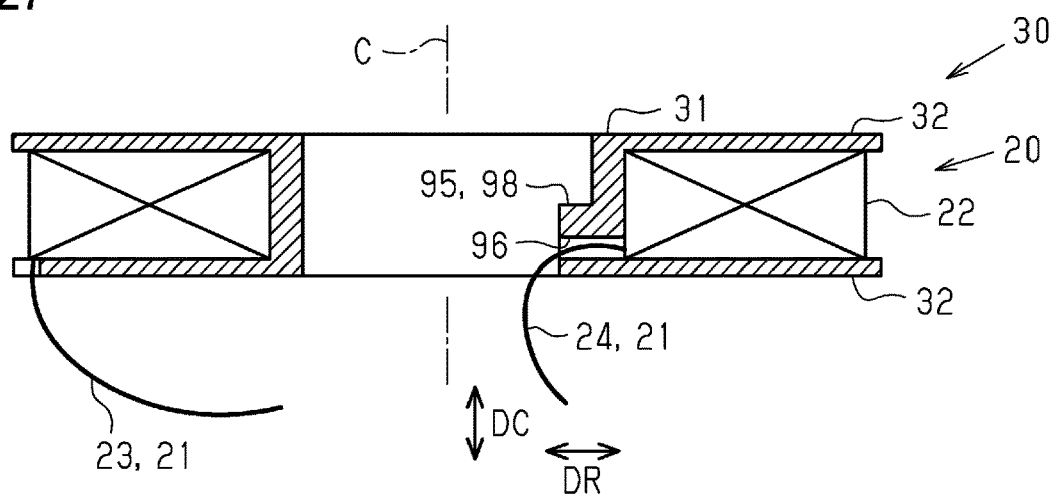
FIG. 27 is a cross-sectional view of the bobbin wound with a wire according to a ninth modification.
Figure 28:
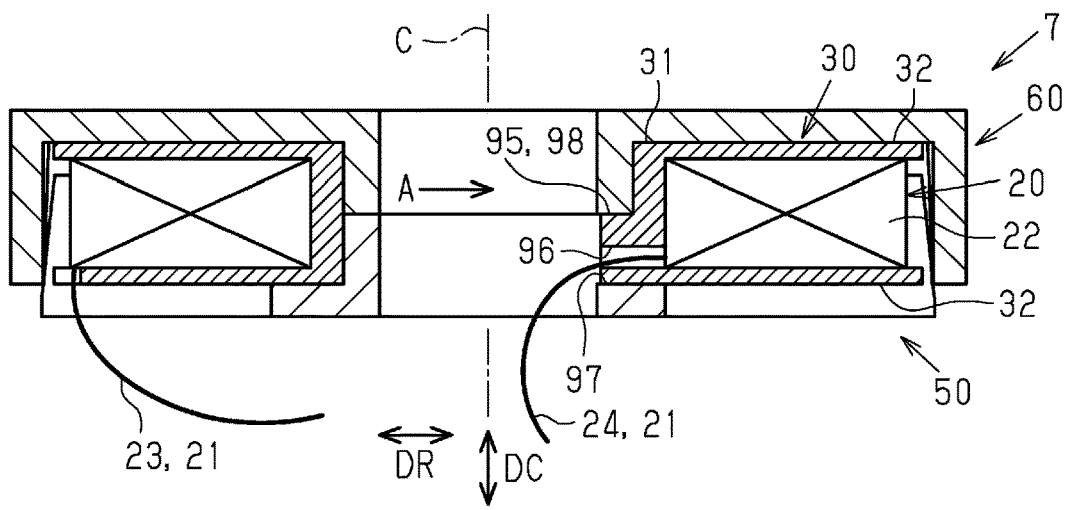
FIG. 28 is a cross-sectional view of the coil unit.
Figure 29:
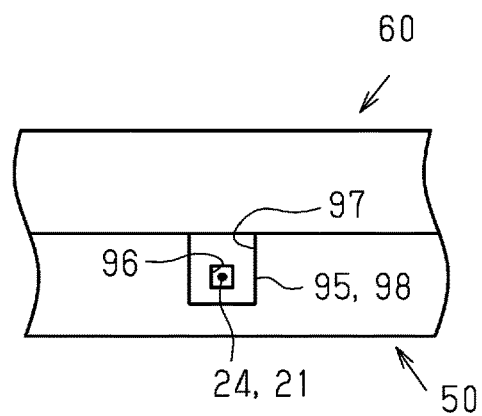
FIG. 29 is a diagram showing a view taken in arrow A in FIG. 28.

The bobbin 30 and the stator core 40 according to another modification will now be described with reference to FIGS. 27 to 29. FIG. 29 is a diagram showing a view taken in arrow A in FIG. 28. As shown in FIG. 27, the tubular portion 31 of the bobbin 30 includes a projection 95. The projection 95 projects from the inner circumferential surface of the tubular portion 31 in the radial direction DR. The projection 95 includes a through-hole 96 through which the second lead 24 is inserted. The projection 95 is made of an insulating resin. As shown in FIGS. 28 and 29, the first core 50 includes a notch 97 into which the projection 95 is inserted. In this manner, the portion of the second lead 24 that contacts the stator core 40 is surrounded by the insulating member 98. This structure obtains a creepage distance between the second lead 24 and the stator core 40 and improves insulation.

Tenth Modification

Figure 30:
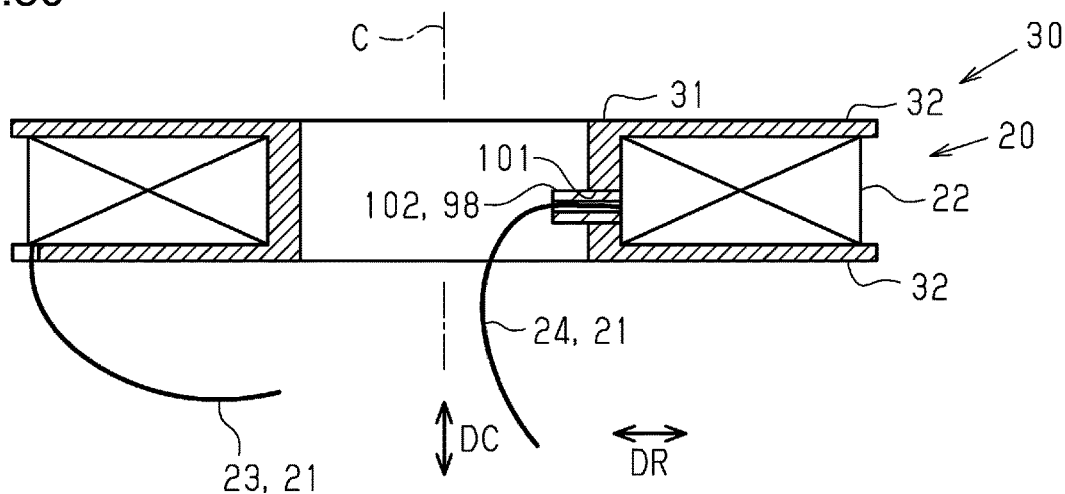
FIG. 30 is a cross-sectional view of the bobbin wound with a wire according to a tenth modification.
Figure 31:
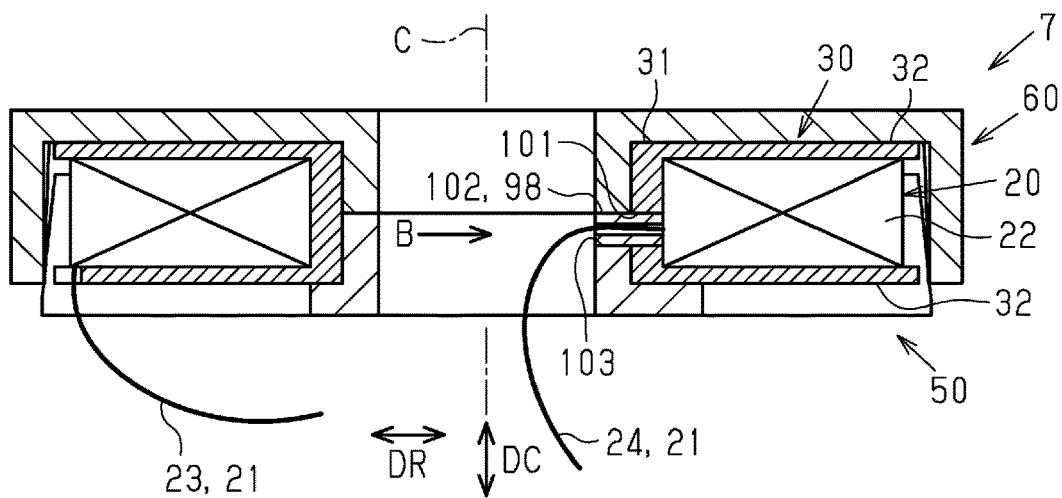
FIG. 31 is a cross-sectional view of the coil unit.
Figure 32:
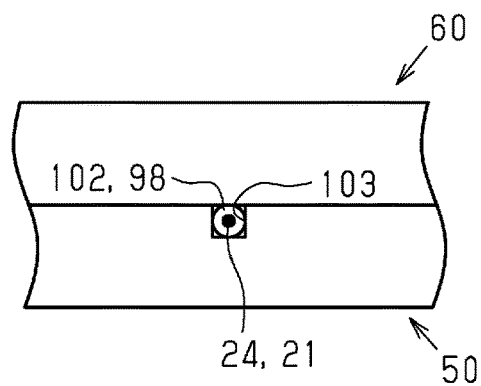
FIG. 32 is a diagram showing a view taken in arrow B in FIG. 31.

The bobbin 30 and the stator core 40 according to another modification will now be described with reference to FIGS. 30 to 32. FIG. 32 is a diagram showing a view taken in arrow B in FIG. 30. As shown in FIG. 30, the tubular portion 31 of the bobbin 30 includes a tube through-hole 101 through which a tube 102 extends. The tube 102 is made of an insulating resin. The tube through-hole 101 extends through the tubular portion 31 in the radial direction DR. The tube 102 is arranged in the tube through-hole 101. The second lead 24 is inserted through the tube 102. As shown in FIGS. 31 and 32, the first core 50 includes a tube notch 103 into which the tube 102 is inserted. In this manner, the portion of the second lead 24 that contacts the stator core 40 is surrounded by the insulating member 98. This structure obtains the creepage distance between the second lead 24 and the stator core 40 and improves insulation.

Figure 33:
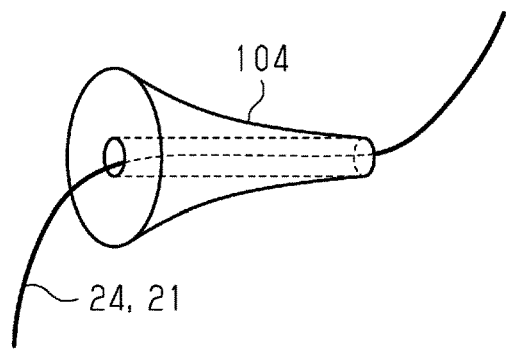
FIG. 33 is a diagram illustrating a tube.

As shown in FIG. 33, a tube 104 may be formed to have a cross-sectional area that increases from a first end to a second end. The cross-sectional area indicates the area of a cross-section that intersects a line extending in the through-hole of the tube 104. The first end is arranged at the inner circumferential surface side of the tubular portion 31 of the bobbin 30, and the second end is arranged at the outer circumferential surface side of the tubular portion 31 of the bobbin 30. In this case, the tube 104 is preferably flexible. Such a tube 104 reduces contact between the second lead 24 and the first core 50 as compared with the tube 104. The tube 104 also obtains a creepage distance.

Eleventh Modification

Figure 34:
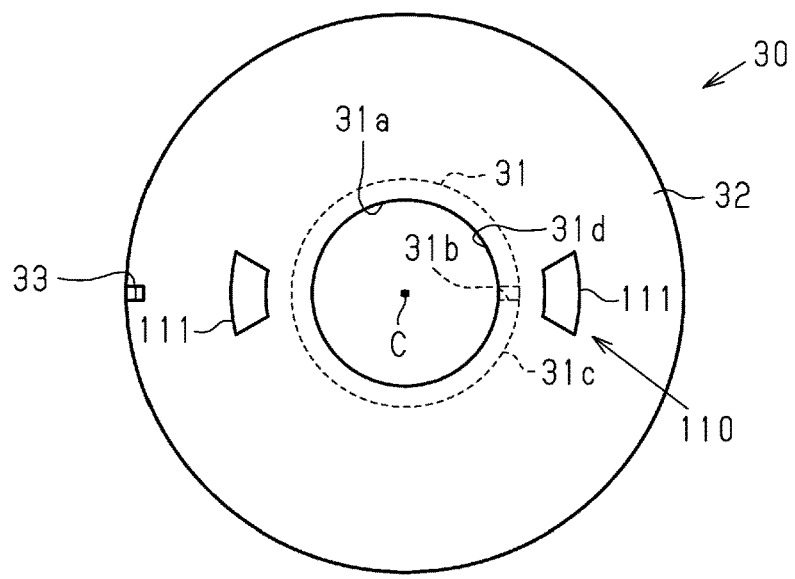
FIG. 34 is a plan view of the bobbin according to an eleventh modification.
Figure 35:
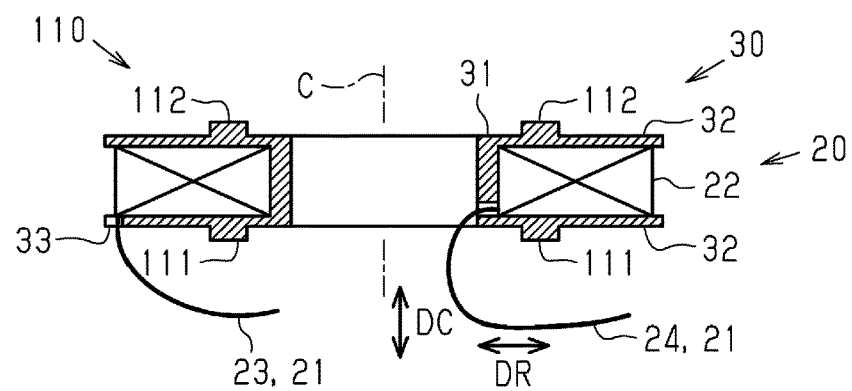
FIG. 35 is a cross-sectional view of the bobbin wound with a wire.
Figure 36:
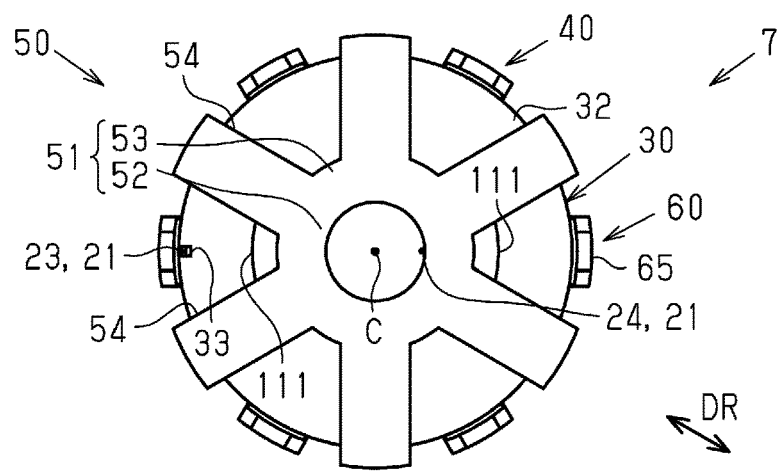
FIG. 36 is a plan view of the coil unit.

The bobbin 30 according to another modification will now be described with reference to FIGS. 34 to 36. In this example, the bobbin 30 includes a positioning portion 110. As shown in FIG. 35, the positioning portion 110 includes first steps 111 and second steps 112 that are engaged with the stator core 40. The first steps 111 and the second steps 112 are arranged on the outer surfaces of the flanges 32. The first steps 111 of the flange 32 arranged toward the first core 50 are each formed to contact two of the first projections 54 and the first flange 53 of the first core 50. The two first steps 111 of the flange 32 arranged toward the first core 50 are located at symmetrical positions with respect to the rotation axis C. The second steps 112 of the flange 32 arranged toward the second core 60 are each formed to contact two of the second projections 64 and the second flange 63 of the second core 60. The two second steps 112 of the flange 32 arranged toward the second core 60 are located at symmetrical positions with respect to the rotation axis C. With this structure, the bobbin 30 is easily positioned relative to the stator core 40.

Twelfth Modification

Figure 37:
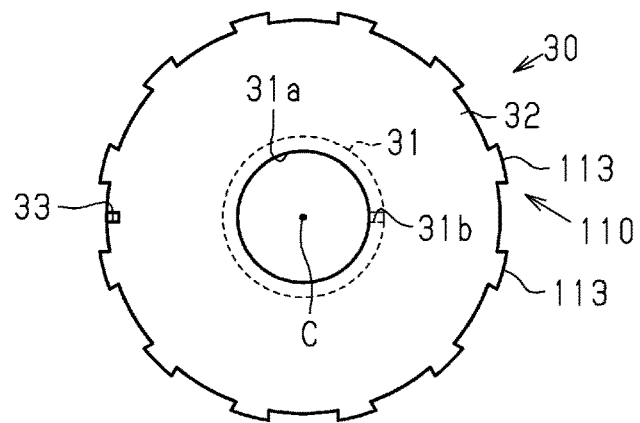
FIG. 37 is a plan view of the bobbin according to a twelfth modification.
Figure 38:
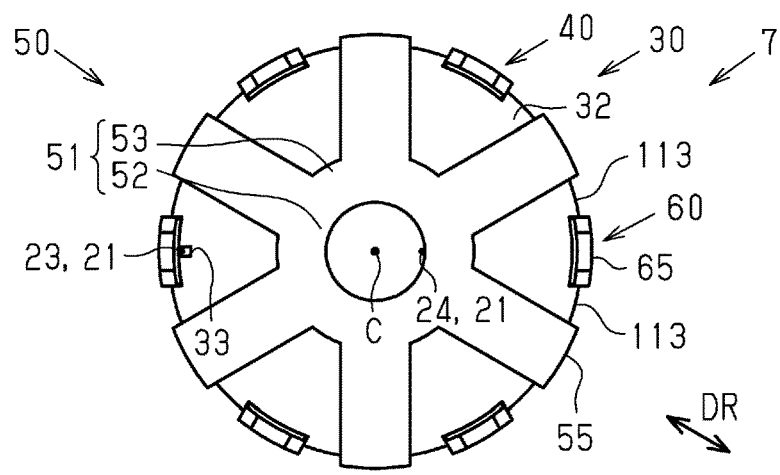
FIG. 38 is a plan view of the coil unit.

The bobbin 30 according to another modification will now be described with reference to FIGS. 37 and 38. In this example, the bobbin 30 includes the positioning portion 110. The positioning portion 110 includes steps 113 engaged with the stator core 40. The steps 113 are arranged on at least one of the two flanges 32 of the bobbin 30. The steps 113 project from the outer edge of the flange 32 in the radial direction DR. In the present embodiment, the steps 113 are each arranged between the first claw pole 55 and the second claw pole 65 on the flange 32 that is in contact with the first core 50 so that the steps 113 contact the two magnetic poles. With this structure, the bobbin 30 is easily positioned relative to the stator core 40.

Thirteenth Modification

Figure 39:
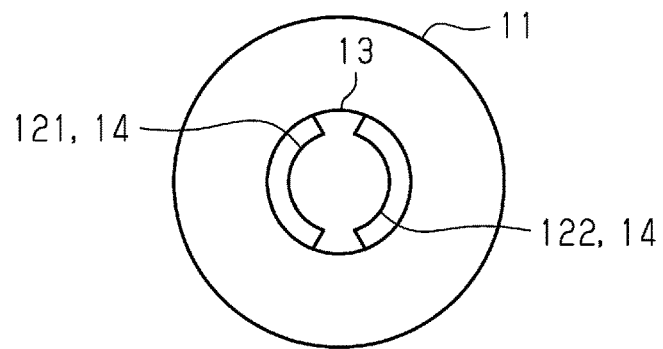
FIG. 39 is a plan view of the member, which is formed by coupling the first member to the rod, according to a thirteenth modification.

The holding member 10 according to another modification will now be described with reference to FIG. 39. FIG.

39 is a plan view of the member formed by coupling the first member 11 to the rod 13. In this example, the rod 13 of the holding member 10 includes a first guide 121 and a second guide 122 as the rod guides 14. The first guide 121 is formed so that three first leads 23 are inserted through the first guide 121. The second guide 122 is formed so that three second leads 24 are inserted through the second guide 122. This structure simplifies the structure of the rod 13.

Fourteenth Modification

Figure 40:
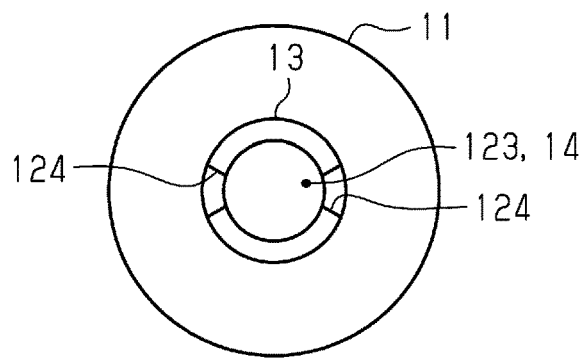
FIG. 40 is a plan view of the member, which is formed by coupling the first member to the rod, according to a fourteenth modification.
Figure 41:
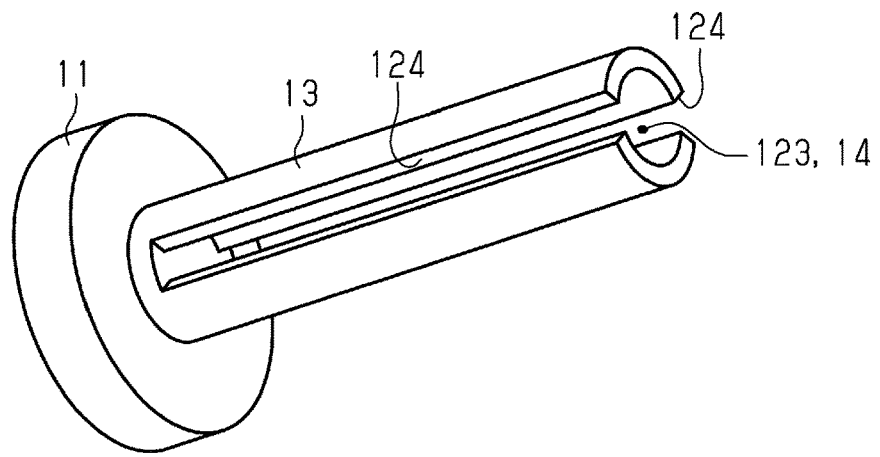
FIG. 41 is a perspective view of the member, which is formed by coupling the first member to the rod.

The holding member 10 according to another modification will now be described with reference to FIGS. 40 and 41. FIG. 40 is a plan view of the member formed by coupling the first member 11 to the rod 13. In this example, the rod 13 of the holding member 10 includes a lead accommodating portion 123 as the rod guide 14. The lead accommodating portion 123 is formed so that three first leads 23 and three second leads 24 are inserted through the lead accommodating portion 123. The lead accommodating portion 123 is formed to be space extending in rotation axis C inside the rod 13. The rod 13 has side surfaces that include slits 124 connected to the lead accommodating portion 123 (refer to FIG. 41).

Fifteenth Modification

The spacer 8 according to another modification will now be described with reference to FIGS. 42 and 44. The spacer 8 includes at least one of a first bending guide 131 and a second bending guide 132. The first bending guide 131 gradually bends the first lead 23. Specifically, the first bending guide 131 guides the first lead 23 without breaking the first lead 23. The second bending guide 132 gradually bends the second lead 24. Specifically, the second bending guide 132 guides the second lead 24 without breaking the second lead 24.

Figure 42:
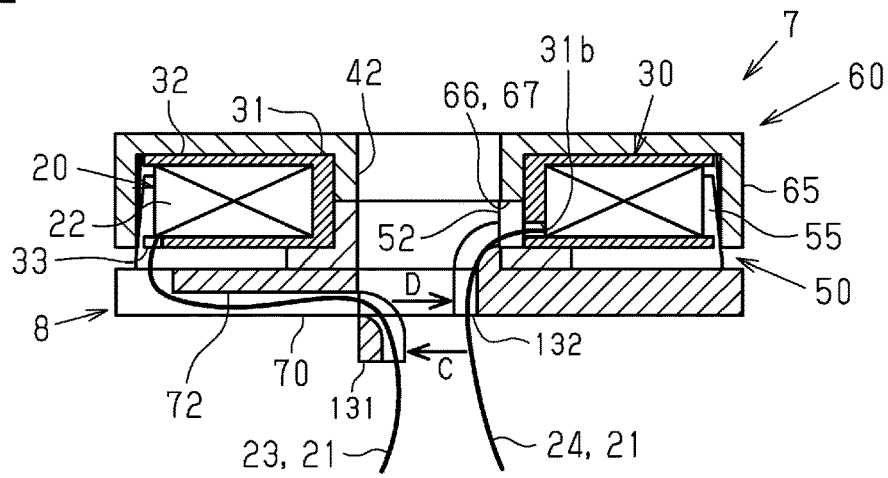
FIG. 42 is a cross-sectional view of the coil unit and the spacer according to a fifteenth modification.
Figure 43:
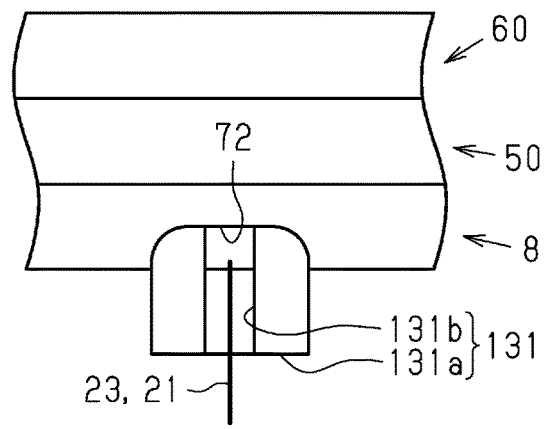
FIG. 43 is a diagram showing a view taken in arrow C in FIG. 42.

As shown in FIGS. 42 and 43, the first bending guide 131 includes a first guide body 131a and a first guide groove 131b arranged in the first guide body 131a. The first guide body 131a is arranged at a portion where the inner circumferential surface of the insertion hole 71 intersects the lead guide 72. The first guide body 131a extends in the direction (hereafter lead guide direction) that guides the first lead 23 in the rotation axis C. The lead guide direction in the present embodiment extends toward the second member 12 (refer to FIG. 1). The first guide groove 131b is formed in the first guide body 131a to be continuous with the lead guide 72. As the first guide groove 131b extends toward the rotation axis C, the first guide groove 131b is gradually curved and extends in the lead guide direction.

Figure 44:
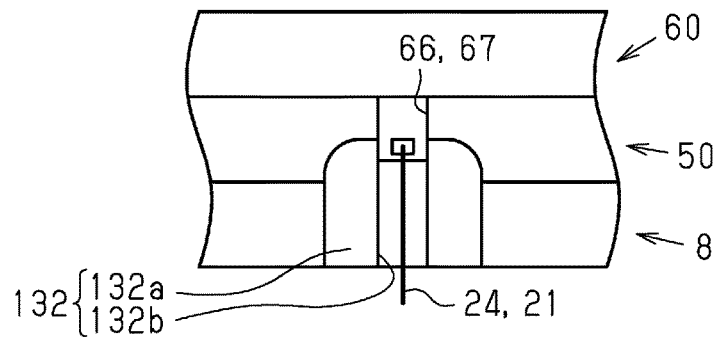
FIG. 44 is a diagram showing a view taken in arrow D in FIG. 42.

As shown in FIGS. 42 and 44, the second bending guide 132 includes a second guide body 132a and a second guide groove 132b arranged in the second guide body 132a. The second guide body 132a is arranged in the insertion hole 71 where the second lead 24 extends. The second guide body 132a extends to the vicinity of the notch 67 (inter-core gap 66) of the first core 50 along the inner circumferential surface of the first tubular portion 52 of the first core 50 where the second lead 24 extends. The second guide groove 132b is formed in the second guide body 132a to be continuous with the notch 67 of the first core 50. As the second guide groove 132b becomes closer to the rotation axis C, the second guide groove 132b is gradually curved and extends in the lead guide direction. This structure gradually bends at least one of the first lead 23 and the second lead 24 and reduces breaking of the at least one of the first lead 23 and the second lead 24.

Other Modifications

The motor 1 of the present disclosure may be modified as follows in addition to the above embodiment and modifications or have a mode in which at least two modifications are combined as long as the modifications are consistent with each other.

In the present embodiment and the modifications, the motor 1 is of an outer rotor type and includes a claw pole stator. Alternatively, the technique of the present disclosure can be applied to a stator of a motor of an inner rotor type. In the technique of the present disclosure, magnetic poles are arranged in one of the inner circumferential portion and the outer circumferential portion of the stator core 40, and the first lead 23 and the second lead 24 are arranged in the other one of the inner circumferential portion and the outer circumferential portion. In contrast, in the stator of the motor of the inner rotor type, the first lead 23 and the second lead 24 are arranged in the outer circumferential portion of the stator.

Although the motor 1 according to the embodiment has been described above, it will be understood that various changes in modes and details can be made without departing from the spirit and scope of the motor 1 in the claims.

What is claimed is:

1. A motor comprising:
   a stator including coil units stacked in an axial direction with a nonmagnetic body arranged therebetween; and
   a rotor configured to be rotatable about a rotation axis, each of the coil units including
   a coil, and
   a stator core,
   the coil including an annular winding wound about the rotation axis, and the stator core being arranged to surround at least part of the winding of the coil,
   the stator core including projections formed on each of two axial ends of the stator core, alternately arranged in a circumferential direction, and projecting radially toward the rotor from the two axial ends of the stator core,
   the coil including s the winding and two leads extending from the winding,
   at least one of a first lead of the two leads and a second lead of the two leads is arranged to extend between stator cores of two of the coil units, and
   a magnet pole being arranged in one of an inner circumferential portion and an outer circumferential portion of the stator core, and the first lead and the second lead being arranged in an other one of the inner circumferential portion and the outer circumferential portion,
   a spacer including the nonmagnetic body being arranged between the coil units,
   the spacer including a lead guide, and
   at least one of the first lead and the second lead being arranged to extend in the lead guide of the spacer.

2. The motor according to claim 1, wherein
   the spacer includes at least one of
   a first engagement portion that engages the first lead and
   a second engagement portion that engages the second lead.

3. The motor according to claim 2, wherein
   the spacer includes at least one of
   a first bending guide that gradually bends the first lead and
   a second bending guide that gradually bends the second lead.

4. The motor according to claim 1, wherein
   the spacer includes at least one of a first bending guide that gradually bends the first lead and a second bending guide that gradually bends the second lead.

5. The motor according to claim 1, wherein
the stator core includes
an annular first ring formed at one side in the axial direction,
first projections that project radially from the first ring, and
first claw poles arranged on the first projections and extending in the axial direction,
the stator core further includes
an annular second ring formed at another side in the axial direction,
second projections that project radially from the second ring, and
second claw poles arranged on the second projections and extending in the axial direction,
the first claw poles and the second claw poles are alternately arranged in the circumferential direction, and
at least one of the first lead and the second lead
extends out of the stator core from a first range surrounded by two adjacent ones of the first projections and the first ring or a second range surrounded by two adjacent ones of the second projections and the second ring and
extends through a space between the stator cores of two of the coil units.

6. The motor according to claim 5, wherein
at least one of the first lead and the second lead
extends out of a space between the coil and the second claw pole in the first range or a space between the coil and the first claw pole in the second range and
extends through a space between the stator cores of the two of the coil units.

7. The motor according to claim 5, wherein
the stator core includes
a first core including the first ring, the first projections, and the first claw poles, and
a second core including the second ring, the second projections, and the second claw poles, and
at least one of the first lead and the second lead extends through an inter-core gap between the first core and the second core at a coupling portion of the first core and the second core.

8. The motor according to claim 6, wherein
the stator core includes
a first core including the first ring, the first projections, and the first claw poles, and
a second core including the second ring, the second projections, and the second claw poles, and
at least one of the first lead and the second lead extends through an inter-core gap between the first core and the second core at a coupling portion of the first core and the second core.

9. The motor according to claim 1, wherein
the coil units are coupled by a holding member that includes a rod extending through the coil units,
the rod has an outer circumference that includes a rod guide, and
the first lead and the second lead are arranged along the rod guide.

10. The motor according to claim 9, wherein
at least one of the first lead and the second lead includes a portion contacting the stator core, and the portion is surrounded by an insulating member.

11. The motor according to claim 9, further comprising:
a bobbin including a tubular portion with a center at a rotation axis,
the winding of the coil being formed by a wire wound around the tubular portion of the bobbin, and
the stator core holding the bobbin.

12. The motor according to claim 1, wherein
at least one of the first lead and the second lead includes a portion contacting the stator core, and the portion is surrounded by an insulating member.

13. The motor according to claim 12, further comprising:
a bobbin including a tubular portion with a center at a rotation axis,
the winding of the coil being formed by a wire wound around the tubular portion of the bobbin, and
the stator core holding the bobbin.

14. The motor according to claim 1, further comprising:
a bobbin including a tubular portion with a center at a rotation axis,
the winding of the coil being formed by a wire wound around the tubular portion of the bobbin, and
the stator core holding the bobbin.

* * * * *